(12) United States Patent
Mimura et al.

(10) Patent No.: US 8,459,806 B2
(45) Date of Patent: Jun. 11, 2013

(54) TRIANGULAR PYRAMID TYPE CUBE CORNER RETROREFLECTION ARTICLE, AND ITS MANUFACTURING METHOD

(75) Inventors: Ikuo Mimura, Uozu (JP); Chihiro Hayashi, Namerikawa (JP); Keiji Amemiya, Namerikawa (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 582 days.

(21) Appl. No.: 12/438,048

(22) PCT Filed: Aug. 22, 2007

(86) PCT No.: PCT/JP2007/066711
§ 371 (c)(1),
(2), (4) Date: Sep. 7, 2010

(87) PCT Pub. No.: WO2008/023830
PCT Pub. Date: Feb. 28, 2008

(65) Prior Publication Data
US 2011/0013281 A1 Jan. 20, 2011

(30) Foreign Application Priority Data

Aug. 22, 2006 (JP) .............................. 2006-224917
Aug. 22, 2006 (JP) .............................. 2006-224918
Aug. 24, 2006 (JP) .............................. 2006-227648
Aug. 21, 2007 (JP) .............................. 2007-215040
Aug. 21, 2007 (JP) .............................. 2007-215041
Aug. 21, 2007 (JP) .............................. 2007-215042
Aug. 21, 2007 (JP) .............................. 2007-215043

(51) Int. Cl.
*G02B 5/124* (2006.01)

(52) U.S. Cl.
USPC .......................................... 359/530; 359/546

(58) Field of Classification Search
USPC .................... 359/529–533, 546–552
See application file for complete search history.

(56) References Cited

U.S. PATENT DOCUMENTS 3,948,714 A * 4/1976 Steiner et al. ................. 156/245
5,764,413 A 6/1998 Smith et al.
5,812,315 A 9/1998 Smith et al.
(Continued)

FOREIGN PATENT DOCUMENTS

EP 1 081 511 3/2001
JP 11507745 A 7/1999
(Continued)

*Primary Examiner* — Frank Font
(74) *Attorney, Agent, or Firm* — Fitzpatrick, Cella, Harper & Scinto

(57) ABSTRACT

The present invention relates to a triangular pyramidal cube corner retroreflective article and a producing method thereof. In the triangular pyramidal cube corner retroreflective article, a triangular pyramidal cube corner retroreflective element pair group is disposed in a closest-packed fashion on a common plane defined by three base lines, and the each of retroreflective elements in a pair having one base line (A-B) shared by the retroreflective elements in the pair. The triangular pyramidal cube corner retroreflective article includes a first element pair group, in which two interior angles ($\alpha=\angle BAC$ and $\beta=\angle ABC$) formed by the shared base line of the element pair and two other base lines are different from each other and the element pair is line-symmetrically disposed in relation to the shared base line (A-B); and a second element pair group, in which the element pair is congruent to a line-symmetrical shape to the first element pair in relation to a line segment connecting vertexes of the base planes.

44 Claims, 36 Drawing Sheets

U.S. PATENT DOCUMENTS

| | | |
|---|---|---|
| 5,822,121 A | 10/1998 | Smith et al. |
| 5,926,314 A | 7/1999 | Smith et al. |
| 6,302,992 B1 | 10/2001 | Smith et al. |
| 6,318,866 B1 | 11/2001 | Mimura et al. |
| 6,533,887 B1 | 3/2003 | Smith et al. |
| 2002/0051292 A1 | 5/2002 | Mimura et al. |
| 2002/0184866 A1 | 12/2002 | Doerflinger |
| 2004/0114244 A1 | 6/2004 | Couzin |
| 2004/0196555 A1 | 10/2004 | Mimura et al. |

FOREIGN PATENT DOCUMENTS

| | | |
|---|---|---|
| JP | 11305017 A | 11/1999 |
| JP | 2001-264525 A | 9/2001 |
| JP | 2002-508085 A | 3/2002 |
| WO | 96/42025 | 12/1996 |
| WO | 99/01786 | 1/1999 |

\* cited by examiner

Conventional technique (A)

(B)

Conventional technique

Conventional technique

Conventional technique

TRIANGULAR PYRAMID TYPE CUBE CORNER RETROREFLECTION ARTICLE, AND ITS MANUFACTURING METHOD

TECHNICAL FIELD

The present invention relates to a retroreflective article which can suitably be used in a traffic sign, a construction sign, a vehicle marking, and the like, the retroreflective article having excellent entrance angularity, observation angularity, and rotation angularity and a producing method thereof.

Particularly the invention relates to a triangular pyramidal cube corner retroreflective article, which exhibits the even rotation angularity with the retroreflective article placed in any azimuth and a producing method thereof.

More particularly the invention relates to a retroreflective sheet which can suitably be used in the traffic sign and the like, the retroreflective sheet having the improved entrance angularity, observation angularity, and rotation angularity and a producing method thereof.

BACKGROUND ART

Conventionally there are proposed some retroreflective sheets having excellent entrance angularity, observation angularity, and rotation angularity.

For example, U.S. Pat. No. 2,310,790 to Jungersen proposes a cube corner retroreflective article having an inclined optical axis, and such retroreflective article having the inclined optical axis has an improved entrance angularity.

European Patent No. 137,736B1 to Hoopman also discloses a triangular pyramidal cube corner retroreflective article similarly having an inclined optical axis, and a direction of the inclined optical axis is opposite to the retroreflective article disclosed by Jungersen (negative inclination). Although the retroreflective performance is improved in an azimuth of the inclined optical axis and an azimuth perpendicular thereto, the retroreflective performance is not improved in other azimuths.

U.S. Pat. No. 5,138,488 to Szczech also discloses a triangular pyramidal cube corner retroreflective article similarly having an inclined optical axis. Similarly to the invention by Hoopman, although the retroreflective performance is improved in the azimuth the inclined optical axis and the azimuth perpendicular thereto, the retroreflective performance is not improved in other azimuths.

In the three inventions described above, entrance angularity is improved by utilizing an optical principle that the retroreflective performance is improved in the direction of the inclined optical axis. However, the retroreflective performance is not improved in azimuths except for the azimuth of the inclined optical axis and the azimuth perpendicular thereto.

There are proposed various techniques relating to the improvement of the observation angularity.

In U.S. Pat. No. 4,775,219 to Appeldorn, some retroreflective elements having various vertex angle deviations are disposed in a repetitive pattern to slightly diffuse a retroreflective light beam, thereby improving the observation angularity.

With a triangular pyramidal cube corner retroreflective sheet disclosed in U.S. Pat. No. 5,706,132 to Nestgarde, using a group of triangular pyramidal cube corner elements, the directions of the inclined optical axes are defined to be two directions orthogonal to each other, the same retroreflective performance can be obtained regardless of whether the sheet is placed in the longitudinal direction or the lateral direction. However, because the array of elements having inclined axes orthogonal to each other respectively forms independent zones, the sheet is significantly disfigured.

There is also known a triangular pyramidal cube corner retroreflective element (also referred to according to equilateral element) in which lengths of three base lines of the retroreflective element are different from one another.

U.S. Pat. No. 5,926,314 to Smith et al. discloses an inequilateral retroreflective element in which the lengths of the three base lines of the triangular pyramidal cube corner retroreflective element are different from one another. In the patent document, all the formed retroreflective elements have rotationally-symmetrical shapes.

Japanese Patent Publication Laid-Open No. 11-305017 to Mimura et al. discloses an inequilateral retroreflective element in which the lengths of the three base lines of the triangular pyramidal cube corner retroreflective element are different from one another, and depths of the bases lines of the inequilateral retroreflective element are different from one another. However, all the formed retroreflective elements have rotationally-symmetrical shapes.

In a triangular pyramidal cube corner element disclosed in Japanese Patent Publication Laid-Open No. 2001-264525 to Mimura et al., a shared base line (A-B) of an element pair included in a first element pair group does not pass through intersections (A1 and B1) where other two sets of base lines (B-C1 and C1-A; and B-C2 and C2-A) intersect, a base plane of one of the elements is formed into a pentagon (A-A1-C1-B1-B), a base plane of the other element is formed into a triangle (A-C2-B), and a plane (Sc plane) defined by the shared base line (A-B) of an element pair included in the first element pair group is formed with a depth which is different from that of a common plane (S plane) defined by the two base lines (B1-C1, C1-A1 and B-C2, C2-A). However, all the formed retroreflective elements have the rotationally-symmetrical shapes.

There is also proposed a technique of forming a cube corner retroreflective element using a thin plate. Such technique is disclosed in Japanese Patent Nos. 3310297 and 3356290 to Mimura et al., International Patent Application Publication No. 2000-504821 to Klink et al., International Patent Application Publication No. 2002-507945 to Irwin et al., International Patent Application Publication Nos. 2002-509495 and 2002-508085 to Smith at al., International Patent Application Publication No. 2002-507944 to Benson et al., International Patent Application Publication Nos. 2006-520019 and 2006-520711 to Smith, and International Patent Application Publication No. 2006-520712 to Smeenk et al., for example. However, all the formed retroreflective elements have the rotationally-symmetrical shapes.

DISCLOSURE OF THE INVENTION

An object of the invention is to improve the entrance angularity, the observation angularity, and the rotation angularity of the retroreflective article.

More particularly, an object of the invention is provide a triangular pyramidal cube corner retroreflective article having excellent evenness of an appearance as well as the particularly excellent rotation angularity and observation angularity.

Particular applications of such retroreflective article may include a traffic sign, a construction sign, a commercial sign, a vehicle license plate, a vehicle reflective tape, a roadside reflector, a reflector of an optical sensor, and safety cloths.

Another object of the invention is to supply a thin, flexible retroreflective sheet which can be used in the traffic sign, the construction sign, the commercial sign, and the vehicle license plate, and the retroreflective sheet which can be used as the sign by cutting in any direction due to its excellent rotation angularity.

Specific means for solving the problem of the invention will be described in detail.

According to the invention, a triangular pyramidal cube corner retroreflective article is provided, in which a triangular pyramidal cube corner retroreflective element pair group is disposed in a closest-packed fashion on a common plane (S plane) defined by three base lines (A-B, B-C, and C-A), each of the retroreflective elements in a pair having one base line (A-B) shared by the retroreflective elements in the pair, the triangular pyramidal cube corner retroreflective article includes a first element pair group, in which two interior angles ($\alpha=\angle BAC$ and $\beta=\angle ABC$) formed by the shared base line (A-B) of the element pair and two other base lines (B-C and C-A) are different from each other and the elements in the element pair is line-symmetrically disposed in relation to the shared base line (A-B); and a second element pair group, in which the element pair has a shape congruent to a line-symmetrical shape to the first element pair in relation to a line segment connecting apexes (C1 and C2) of the base planes.

The common plane (S plane) is a common base plane which is defined by three base line groups (A-B, B-C1, and C1-A; and A-B, B-C2, and C2-A) of many retroreflective element pair groups, and the base plane (ABC) of the retroreflective element is located on the common base plane.

The known conventional triangular pyramidal cube corner retroreflective element pair is rotational symmetry in relation to a midpoint of the shared base line (A-B). Accordingly, the optical axes of the two retroreflective elements included in the element pair are orientated toward directions rotated by 180 degrees relative to each other. In the triangular pyramidal cube corner retroreflective element having a base plane of the inequilateral triangle (inequilateral element), the optical axis is inclined in a direction perpendicular to the common base line (A-B). In the triangular pyramidal cube corner retroreflective element having three base lines of different lengths to one another (inequilateral element), although the optical axes are not perpendicular to the common base line (A-B), the optical axes have the same inclination angle in each element pair, and the optical axes are inclined in the directions rotated by 180 degrees relative to each other.

Based, on the retroreflective theory of the cube corner retroreflective element, the retroreflective efficiency is improved in the azimuth in which the optical axis is inclined. Therefore, in the rotationally-symmetrical element pair, the azimuths in which the optical axes are inclined are always the directions rotated by 180 degrees relative to each other, and thus, the retroreflective efficiency is improved only in the inclined azimuth, while the retroreflective efficiency is slightly improved in other azimuths.

On the other hand, in the retroreflective element pair of the invention, the retroreflective elements form the line-symmetrical pair, and thus, the azimuths of the two optical axes of the element pair become symmetrical. The optical axes are formed in the four directions by combining the two types of the element pairs having different optical axes, so that the retroreflectivity can be improved in the wide range of azimuths.

The triangular pyramidal cube corner retroreflective element, which can be used in the invention, includes the two types of retroreflective element pairs; the element pair group, in which the element pair is formed with the elements line-symmetrically disposed in relation to the shared base line (A-B); and another element pair group, in which the element pair is congruent to the line-symmetrical shape to the former element pair in relation to the apexes (C1 and C2) of the base planes. Each of the all element pair includes inequilateral elements, and is formed as a line-symmetric element pair.

In the triangular pyramidal cube corner retroreflective article according to the invention, it is preferable that an inclination angle ($\theta$) ranges from 0.5 to 25 degrees, and an azimuth angle ($\theta a$) ranges from 5 to 85 degrees or from 95 to 175 degrees, where the inclination angle ($\theta$) of an optical axis is an angle ($\angle PHQ$) which is defined by an intersection (P) of a perpendicular drawn from a vertex (H) of the retroreflective element to a base plane (ABC) and an intersection (Q) of the optical axis and the base plane (ABC), and where the direction angle ($\theta a$) of the optical axis is an angle ($\angle CPQ$) which is defined by a line segment (C-P) formed by a vertex (C) of the base plane triangle (ABC) and the intersection (P) and a line (P-Q).

The element having the inclination angle ($\theta$) of the optical axis smaller than 0.5 degree is not preferable because although such element show the excellent retroreflective performance for the incident light with extremely small entrance angle, that is, the light incident from the front-face direction, the retroreflective performance is significantly lowered for the large entrance angle.

In the element having the inclination angle ($\theta$) of the optical axis larger than 25 degrees, the retroreflective performance is deteriorated for the light incident from the front-face direction.

Additionally, a difference in area among three retroreflective planes (a1, b1, and c1; and a2, b2, and c2) of the element becomes excessive, and thus a desirable retroreflective performance is hardly obtained also for the large entrance angle.

That is, the inclination angle ($\theta$) ranging from 0.5 to 25 degrees is preferable in order to provide desirable entrance angularity.

The azimuth angle ($\theta a$) of the optical axis ranging from 5 to 85 degrees or from 95 to 175 degrees is preferable. The retroreflective article including the elements having such azimuth angle shows the even retroreflective performance in all the azimuths.

The azimuth angle ($\theta a$) of the optical axis in the invention corresponds to a concept that the inclination direction of the optical axis in the isosceles element becomes positive or negative. In the known conventional isosceles element, the positive inclination means that the optical axis is inclined in the opposite direction to the shared base line (A-B), and the negative inclination means that the optical axis is inclined in the direction of the shared base line (A-B).

In the retroreflective element of the invention having the azimuth angle ($\theta a$) ranging from −90 to 90 degrees, the optical axis is inclined in the opposite direction to the shared base line (A-B). In the retroreflective element of the invention having the azimuth angle ($\theta a$) ranging from 90 to 270 degrees, the optical axis is inclined in the direction toward the shared base line (A-B). The retroreflective element having the azimuth angle ($\theta a$) of 0 degree is the positively-inclined isosceles element, and the retroreflective element having the azimuth angle ($\theta a$) of 180 degrees matches the negatively-inclined isosceles element.

The azimuth angle ($\theta a$) can become −90 degrees or +90 degrees. However, such element group hardly improves the rotation angularity because the optical axes of the first and second element pair groups match with each other.

The retroreflective article of the invention includes the element pair group in which the elements in the element pair is line-symmetrically disposed in relation to the shared base line (A-B) and another element pair group which is congruent to the line-symmetrical shape to the former element pair in relation to the vertexes (C1 and C2) of the base planes. Therefore, when the azimuth angle (θa) of one of the elements included in the first element pair group ranges from 5 to 85 degrees or from 95 to 175 degrees, the optical axis of the other element has the line-symmetrical azimuth angle. Similarly, the second element group has the azimuth angles which are line-symmetrical to the optical axes of the first element group. Accordingly, the optical axes of the four elements included in the retroreflective article are distributed into four directions which are line-symmetrical to one another.

In the triangular pyramidal cube corner retroreflective article according to the invention, it is preferable that the inclination angle (θ) ranges from 3 to 15 degrees, and the azimuth angle (θa) ranges from 25 to 65 degrees or from 115 to 155 degrees.

In the triangular pyramidal cube corner retroreflective article according to the invention, it is more preferable that the inclination angle (θ) ranges from 3 to 15 degrees, and the azimuth angle (θa) ranges from 40 to 50 degrees or from 130 to 140 degrees.

In the triangular pyramidal cube corner retroreflective article according to the invention, it is preferable that the inclination angle (θ) ranges from 4 to 8 degrees, and the azimuth angle (θa) ranges from 43 to 47 degrees or from 133 to 137 degrees. In such retroreflective article, the four optical axes are disposed separated with each other by about 90 degrees, and an excellent azimuth angle characteristic is provided.

In the triangular pyramidal cube corner retroreflective article according to the invention, it is preferable that values (α/180°, β/180°, χ/180°) exist in one of a first region surrounded by (0.250, 0.275, 0.475), (0.450, 0.475, 0.075), and (0.050, 0.475, 0.475) and a second region surrounded by (0.275, 0.250, 0.475), (0.475, 0.450, 0.075), and (0.475, 0.050, 0.475), when values (α/180°, β/180°, χ/180°) obtained by respectively dividing three internal angles α(∠BAC), β(∠ABC), and χ(∠ACB) of the triangular pyramidal retroreflective element by 180° are expressed in a triangular coordinate.

In the triangular pyramidal cube corner retroreflective article according to the invention, it is preferable that a height (h=HP) of the retroreflective element ranges from 20 to 4,000 μm. The retroreflective element having a height smaller than 20 μm is not preferable because a diffraction effect becomes excessive, and thus divergence of the retroreflective light becomes excessive to lower the retroreflective efficiency. The retroreflective element having a height larger than 4,000 μm is not preferable because the retroreflective element is excessively enlarged, and thus the flexible sheet-like retroreflective article is hardly obtained.

In the triangular pyramidal cube corner retroreflective article according to the invention, it is preferable that a height (h=HP) of the retroreflective element ranges from 60 to 150 μm. The retroreflective article in which the height of the element is equal to or smaller than 150 μm can be obtained as a flexible sheet which can adhere easily to a small curved surface and thus, preferable.

In the triangular pyramidal cube corner retroreflective article according to the invention, it is preferable that preferably at least one of heights (ha, hb, and hc) from apexes (H1 and H2) of the retroreflective element pair to common planes (Sa plane, Sb plane, and Sc plane) is different from other heights, when a common plane (Sa plane) is defined by base lines of reflective side faces (a1 and a2), a common plane (Sb plane) is defined by base lines of reflective side faces (b1 and b2), and a common plane (Sc plane) is defined by base lines of reflective side faces (c1 and c2).

In the retroreflective element whose optical axis is not inclined, that is, in a so-called normal retroreflective element, areas of three reflective side faces (a1, b1, and c1; and a2, b2, and c2) are equal to one another. However, in the retroreflective element having the inclined optical axis, the areas of the reflective side faces are not equal to one another and thus the retroreflective efficiency is lowered. In order to solve the problem, at least one of heights (ha, hb, and hc) from apexes (H1 and H2) of the retroreflective element pair to common planes (Sa plane, Sb plane, and Sc plane) may differ from other heights so that the areas of the three reflective side faces are equal to one another.

A method for deepening the base line of the reflective side face having the smaller area to increase the height from the vertex can be adopted in order to equalize the areas of the reflective side faces to one another.

A method for shallowing the base line of the reflective side face having the larger area to decrease the height from the vertex can also be adopted. The element in which at least one of heights (ha, hb, and hc) from apexes (H1 and H2) of the retroreflective element pair to common planes (Sa plane, Sb plane, and Sc plane) differ from one another is formed by either of the methods.

In the retroreflective element of the preferred embodiment of the invention, the areas of the three reflective side faces are not equal to one another because it has three base lines of lengths different to one another. Accordingly, it is preferable to adopt the triangular pyramidal cube corner retroreflective article, wherein the heights (ha, hb, and hc) from the apexes (H1 and H2) of the retroreflective element pair to common planes (Sa plane, Sb plane, and Sc plane) are different from one another.

In the triangular pyramidal cube corner retroreflective article according to the invention, it is preferable that a following expression holds:

$$1.05 < h\text{max}/h\text{min} < 1.9 \quad \text{(expression 1)}$$

where hmax is the maximum height and hmin is the minimum height of the heights (ha, hb, and hc) so as to improve retroreflective performance.

In the triangular pyramidal cube corner retroreflective article according to the invention, it is further preferable assuming that hmax is the maximum height and hmin is the minimum height of the heights (ha, hb, and hc), hmax is a height between a plane defined by a shortest base line and the apexes (H1 and H2) and hmin is a height between a plane defined by a longest base line and the apexes (H1 and H2) so as to improve retroreflective performance.

Additionally, it is important to improve the observation angularity of an element included in the line-symmetrical retroreflective element pair of the invention in order to ensure visibility of a driver of the vehicle particularly in cases where a headlight and a driver position are largely away from each other like a large-size vehicle such as a bus and a truck trailer.

A method for improving the observation angularity of the line-symmetrical retroreflective element pair will be described below.

In the triangular pyramidal cube corner retroreflective article having line-symmetrical elements and improved observation angle according to the invention, it is preferable that the retroreflective element is formed by V-shape grooves (x, y1, and y2) having a cross section in substantially V-shape and assuming that Vx, Vy1, and Vy2 are theoretical V-groove angles with which prism vertex angles (Pab, Pbc, and Pca) become 90 degrees, a V-groove angle in at least one of directions has a deviation (dVx, dVy1, or dVy2) of ±(0.1 to 20) min, more preferably of ±(0.2 to 10) min.

The deviation (dVx, dVy1, or dVy2) in either direction whether to increase or to decrease the prism vertex angles (Pab, Pbc, and Pca) relative to 90 degrees has the same effect.

In a retroreflective element having a theoretical shape in which the divergence is not generated, the whole of the retroreflective light is returned to the light source, and the retroreflective light does not reach eyes of the driver. On the other hand, in the retroreflective element having the slight deviation in the vertex angle, the incident light is not retroreflected in the direction of 180 degrees, but the light returns in the direction of the light source in the form of the slightly divergent light flux.

Accordingly, in the retroreflective element having the slight deviation in the vertex angle, the incident light retroreflected as the slightly divergent light flux, and thus such light reaches the eyes of the driver located at away from the light source. Usually the preferable spread angle of the light flux ranges from 2 to 3 degrees at a maximum. The excessive spread causes the retroreflective light to be excessively lowered at a specific observation angle.

In the triangular pyramidal cube corner retroreflective article according to the invention, it is preferable that the V-groove angle in at least one of directions has a deviation (dVx, dVy1, or dVy2) of ±(0.1 to 20) min so as to obtain the spread light flux, and preferably the deviations are provided to all three directions so as to obtain the even spread of the light flux.

The deviation of the V-groove angle is realized by previously forming a cutting tool used to cut the element in small shape. Alternatively, the desired deviation can be provided by inclining or rotating the cutting tool having no deviation relative to a cutting direction.

In the triangular pyramidal cube corner retroreflective article according to the invention, it is preferable that the V-groove angle in at least one of directions of the V-shape grooves (x, y1, and y2) is formed to have at least two types of deviations alternatively so as to obtain even spread of the light flux. More preferably, plurality types of deviations are provided alternatively in the three directions.

In the triangular pyramidal cube corner retroreflective article according to the invention, the V-groove angle in at least one of directions of the V-shape grooves may have a left-right asymmetrical V-shape groove shape. In the left-right asymmetrical V-shape groove shape, the deviation may be formed only on one side, or the deviations may be formed on both sides.

The methods for providing the deviation to the V-groove angle can be independently adopted or combined.

In the triangular pyramidal cube corner retroreflective article according to the invention, a trajectory of a base portion of a groove in at least one of directions of the V-shape grooves (x, y1, and y2) forming the retroreflective element may be a non-linear base line which does not form a straight line.

In the triangular pyramidal cube corner retroreflective article according to the invention, it is preferable that, assuming that L is a length of an end-to-end straight line connecting both ends of the non-linear base line, a non-linear factor (γAB, γBC, or γCA) ranges from 0.0001 L to 0.05 L, the non-linear factor (γAB, γBC, or γCA) being defined as a maximum distance between the end-to-end straight line and an intersection of the non-linear base line with a perpendicular from the end-to-end straight line to the non-linear base line.

In the triangular pyramidal cube corner retroreflective article according to the invention, it is preferable that the trajectory of the non-linear base line is expressed by a curved line selected from an arc, a trigonometric function (sine curve, cosine curve, and tangent curve), an inverse trigonometric function, an elliptical function, a hyperbolic function, and a combination thereof.

The trajectory of the non-linear base line may be expressed by a polygonal line in which straight lines are combined.

In the retroreflective side face having the non-linear base line is preferable to provide even spread light flux because the prism vertex angle formed by the retroreflective side face and another adjacent retroreflective side face is variously changed. Particularly the curved base line is suitable because the prism vertex angle is continuously changed.

In the triangular pyramidal cube corner retroreflective article according to the invention, it is preferable that a cross sectional shape of at least one of the V-groove angles of the V-shape groove (x, y1, and y2) is a non-linear cross section which does not form a straight line.

In the triangular pyramidal cube corner retroreflective article according to the invention, preferably, assuming that G is a length of an end-to-end straight line connecting both ends of the non-linear cross section, a non-linear factor (γAB, γBC, or γCA) ranges from 0.0001 G to 0.05 G, the non-linear factor (γAB, γBC, or γCA) being defined by a maximum distance between the end-to-end straight line and an intersection of the non-linear cross section and a perpendicular from the end-to-end straight line to the non-linear cross section.

In the triangular pyramidal cube corner retroreflective article according to the invention, it is preferable that the non-linear cross section is expressed by a curved line selected from an arc, a trigonometric function (sine curve, cosine curve, and tangent curve), an inverse trigonometric function, an elliptical function, a hyperbolic function, and a combination thereof. The trajectory of the non-linear cross section may be expressed by a polygonal line in which straight lines are combined.

The retroreflective side face having the non-linear base line is preferable to provide even spread of the light flux because the prism vertex angle formed by the retroreflective side face and another adjacent retroreflective side face is variously changed. Particularly the curved base line is suitable because the prism vertex angle is continuously changed.

According to the invention, a triangular pyramidal cube corner retroreflective article is provided, in which a triangular pyramidal cube corner retroreflective element pair group is disposed in a closest-packed fashion on a common plane (S plane) defined by three base lines (A-B, B-C, and C-A), each of the retroreflective elements in a pair having one base line (A-B) shared by the retroreflective elements in the pair, the triangular pyramidal cube corner retroreflective article includes a first element pair group, in which two interior angles (α=∠BAC and β=∠ABC) formed by the shared base line (A-B) of the element pair and two other base lines (B-C and C-A) are different from each other and the elements in the element pair is line-symmetrically disposed in relation to the shared base line (A-B); and a second element pair group, in which the element pair has a shape congruent to a line-symmetrical shape to the former element pair in relation to a line segment connecting vertexes (C1 and C2) of the base planes. In the triangular pyramidal cube corner retroreflective article, the shared base line (A-B) of the element pair included in the first element pair group does not pass through intersections (A1 and B1) where other two sets of base lines (B-C1 and C1-A; and B-C2 and C2-A) intersect, a base plane of one of the elements is formed into a pentagon (A-A1-C1-B1-B), and a base plane of the other element is formed into a triangle (A-C2-B), heights (h1 and h2) of the element pairs included in the first element pair group are different from each other, and the element pair included in the second element pair group is congruent to a line-symmetrical shape to the first element pair in relation to a line segment connecting the vertexes (C1 and C2) of the base plane of the first element pair.

The common plane (S plane) is a common base plane which is defined by three base line groups (A-B, B-C1, and C1-A; or A-B, B-C2, and C2-A) of many retroreflective element pair groups, and the base plane (ABC) of the retroreflective element is located on the common base plane.

The known conventional triangular pyramidal cube corner retroreflective element pair is rotational symmetry in relation to a midpoint of the shared base line (A-B). Accordingly, the optical axes of the two retroreflective elements included in the element pair are orientated toward directions rotated by 180 degrees relative to each other. In the triangular pyramidal cube corner retroreflective element having a base plane of the inequilateral triangle (inequilateral element), the optical axis is inclined in a direction perpendicular to the common base line (A-B). In the triangular pyramidal cube corner retroreflective element having three base lines of different lengths to one another (inequilateral element), although the optical axes are not perpendicular to the common base line (A-B), the optical axes have the same inclination angle in each element pair, and the optical axes are inclined in the directions rotated by 180 degrees relative to each other.

Based on the retroreflective theory of the cube corner retroreflective element, the retroreflective efficiency is improved in the azimuth in which the optical axis is inclined. Therefore, in the rotationally-symmetrical element pair, the azimuths in which the optical axes are inclined are always the directions rotated by 180 degrees relative to each other, and thus, the retroreflective efficiency is improved only in the inclined azimuth, while the retroreflective efficiency is slightly improved in other azimuths.

On the other hand, in the retroreflective element pair of the invention, the retroreflective elements form the line-symmetrical pair, and thus, the inclination azimuths of the two optical axes of the element pair become symmetrical. As shown in FIGS. 5 and 6, the optical axes are formed in the four directions by combining the two types of the element pairs having different optical axes, so that the retroreflective performance can be improved in the wide range of azimuths.

Additionally, in the invention, the shared base line (A-B) of the element pair included in the first element pair group does not pass through the intersections (A1 and B1) where other two sets of base lines (B-C1 and C1-A; and B-C2 and C2-A) intersect, but the shared base line (A-B) passes through the positions (A and B) away therefrom.

The distance (offset amount) between the line segment (A1 and B1) and the line segment (A and B) can be appropriately set in the range of ±(2 to 20) % of the distance of the vertexes (C1 and C2) of the base plane of the element pair. As a result, the heights of the apexes (H1 and H2) from the Sc plane are different from each other, two side faces facing each other (c1 and c2) have different shapes, and the c1 plane is larger than the c2 plane.

Such structure is preferable in the invention, because the entrance angularity can be improved as well as the rotation angularity.

In the triangular pyramidal cube corner retroreflective article according to the invention, a plane (Sc plane) defined by the shared base line (A-B) of the element pair included in the first element pair group is formed with a depth which is different from that of a common plane (S plane) defined by two base lines (B1-C1 and C1-A1; and B-C2 and C2-A).

In the cube corner retroreflective element, a ratio of the areas of the three reflective side faces (a1, b1, and c1; or a2, b2, and c2) is changed depending on the inclination of the optical axis.

In the invention, it is preferable that the areas of the three reflective side faces are equalized as much as possible, so as to improve the retroreflective efficiency and the entrance angularity.

In the invention, when the optical axis is positively inclined, the c1 plane is smaller than the a1 and b1 planes, and thus, the areas of the a1, b1, and c1 planes can be brought close to one another by setting hx larger than hy. In the triangular pyramidal cube corner retroreflective article according to the invention, it is preferable to set hx/hy ranging from 1.05 to 1.5, more preferably hx/hy ranging from 1.07 to 1.4 so as to improve the retroreflective efficiency and the entrance angularity.

In the invention, when the optical axis is negatively inclined, the c1 plane is larger than the a1 and b1 planes, and thus, the areas of the a1, b1, and c1 planes can be brought close to one another by setting hx smaller than hy. In the triangular pyramidal cube corner retroreflective article according to the invention, it is preferable to set hx/hy ranging from 0.67 to 0.95, more preferably hx/hy ranging from 0.71 to 0.93 so as to improve the retroreflective efficiency and the entrance angularity.

According to the invention, the triangular pyramidal cube corner retroreflective article is provided, in which a triangular pyramidal cube corner retroreflective element pair group is disposed in a closest-packed fashion on a common plane (S plane) defined by three base lines (A-B, B-C, and C-A), each of the retroreflective elements in a pair having one base line (A-B) shared by the retroreflective elements in the pair, the triangular pyramidal cube corner retroreflective article including a first element pair group, in which two interior angles ($\alpha = \angle BAC$ and $\beta = \angle ABC$) formed by the shared base line (A-B) of the element pair and two other base lines (B-C and C-A) are different from each other and the elements in the element pair is line-symmetrically disposed in relation to the shared base line (A-B); and a second element pair group, in which the element pair has a shape congruent to a line-symmetrical shape to the first element pair in relation to a line segment connecting vertexes (C1 and C2) of the base planes, preferably base planes of retroreflective element pairs included in the first element pair group and second element pair group are formed in quadrangles (A-D1-E1-B and A-D2-E2-B), and the base lines (D1-E1 and D2-E2) are parallel to the shared base line (A-B).

The common plane (S plane) is a common base plane which is defined three base line groups (A-B, B-C1, and C1-A; or A-B, B-C2, and C2-A) of many retroreflective element pair groups, and the base plane (ABC) of the retroreflective element is located on the common base plane.

The known conventional triangular pyramidal cube corner retroreflective element pair is rotational symmetry in relation to a midpoint of the shared base line (A-B). Accordingly, the optical axes of the two retroreflective elements included in the element pair are orientated toward directions rotated by 180 degrees relative to each other. In the triangular pyramidal cube corner retroreflective element having a base plane of the inequilateral triangle (inequilateral element), the optical axis is inclined in a direction perpendicular to the common base line (A-B). In the triangular pyramidal cube corner retroreflective element having three base lines of different lengths to one another (inequilateral element), although the optical axes are not perpendicular to the common base line (A-B), the optical axes have the same inclination angle in each element pair, and the optical axes are inclined in the directions rotated by 180 degrees relative to each other.

Based on the retroreflective theory of the cube corner retroreflective element, the retroreflective efficiency is improved in the azimuth in which the optical axis is inclined. Therefore, in the rotationally-symmetrical element pair, the azimuths in which the optical axes are inclined are always the directions rotated by 180 degrees relative to each other, and thus, the retroreflective efficiency is improved only in the inclined azimuth, while the retroreflective efficiency is slightly improved in other azimuths.

On the other hand, in the retroreflective element pair of the invention, the retroreflective elements form the line-symmetrical pair, and thus, the inclination azimuths of the two optical axes of the element pair become symmetrical. As shown in FIG. 6, the optical axes are formed in the four directions by combining the two types of the element pairs having different optical axes, so that the retroreflective performance can be improved in the wide range of azimuths.

The triangular pyramidal cube corner retroreflective element of the invention includes the two types of retroreflective element pairs; the element pair group, in which the element pair is formed with the elements line-symmetrically disposed in relation to the shared base line (A-B); and another element pair group, in which the element pair is congruent to the line-symmetrical shape to the former element pair in relation to the vertexes (C1 and C2) of the base planes. Each of the all element pair includes inequilateral elements, and is formed as a line-symmetric element pair.

The retroreflective article of the invention includes many substantially-symmetrical cube corner retroreflective element pair groups sharing one base line and in symmetrical shapes. As shown in FIG. 6, the retroreflective element pair group is formed by: a parallel groove group (x) having substantially symmetrical V-shape cross section and the trajectory of the base portion exhibiting the straight line; and the parallel groove groups (w1 and w2) each having substantially V-shape cross section and the trajectory of the base portion exhibiting a polygonal line. A projection shape of the base plane of the retroreflective element forms isosceles trapezoids (A-B-E1-D1; and A-B-E2-D2).

The retroreflective element pair included in the retroreflective article of the invention may be formed by cutting the groove having V-shape cross sectional from two directions.

The V-shape groove in one of the two directions is formed by the parallel V-shape groove group (x) having substantially symmetrical V-shape cross section and the trajectory of the base portion exhibiting the straight line.

The V-shape groove in the other direction is formed by the two types of the parallel V-shape groove groups (w1 and w2) each having substantially V-shape cross section and the trajectory of the base portion exhibiting a polygonal line. Although the two types of the parallel V-shape groove groups (w1 and w2) have the different phases, the parallel V-shape groove groups (w1 and w2) are formed in parallel with a constant interval.

The base planes of the corner cube retroreflective elements formed by the V-shape grooves in the two directions have the trapezoidal projection shapes (A-B-E1-D1; and A-B-E2-D2), and the corner cube retroreflective elements are formed as the substantially symmetrical element pair facing each other with the longer base line of the trapezoid as the common base line.

In the invention, the polygonal line means a shape in which straight lines having a constant length are coupled continuously and periodically with a constant angle, the coupling portion may steeply be bent with no curved portion. However, the straight lines coupled by a curved portion are preferable in order to form a metal mold to produce the retroreflective article of the invention. Specifically, for example, a radius of the curved portion ranges from 5 to 50 μm.

Based on the conventional method, the retroreflective article of the invention can be formed by the methods such as compression molding, injection molding, injection compression molding, and cast molding using a recessed metal mold in which the retroreflective element is inverted. With reference to the recessed metal mold, a projected metal mold is formed into the V-shape groove by the known conventional methods such as fry cutting, hale machining, shapering, ruling, milling, and pressing, and then the projected metal mold is inverted by electroforming. Because the bending portion of the polygonal line forming the V-shape groove groups (w1 and w2) is formed into a curved shape, the reflective side face is not formed. However, most region is cut out by the V-shape groove group (x), so that the trouble that the retroreflective performance is lowered can be restrained to a minimum level.

In the invention, the substantially symmetrical V-shape groove means a V-shape groove which has angular accuracy to an extent in which the retroreflective performance of the cube corner retroreflective element formed by the V-shape groove can achieve target retroreflective brightness of a retroreflective product.

In the cube corner retroreflective element of the invention, the optical axis having the large inclination angle is used, and thus the excellent entrance angularity can be achieved. In the conventional retroreflective element, the difference in area among the three reflective side faces (a1 plane, b1 plane, and c1 plane and a2 plane, b2 plane, and c2 plane) becomes larger as the inclination of the optical axis is increased, which results in the problem in that the retroreflective efficiency is lowered. On the other hand, in the retroreflective article according to the invention, the decrease of retroreflective efficiency can be restrained to a small level, and thus an inclination angle of the optical axis can be equal to or larger than +3 degrees.

In the retroreflective article according to the invention, preferably the inclination angle of the optical axis of the retroreflective element ranges from +5 to 20 degrees, more preferably the inclination angle of the optical axis of the retroreflective element ranges from +7 to 12 degrees. Even if the optical axis is inclined with such large angle, unlike the conventional triangular pyramidal cube corner retroreflective element, the difference in area among the three reflective side faces (a1 plane, b1 plane, and c1 plane and a2 plane, b2 plane, and c2 plane) becomes small, and thus, the problem of the lowered retroreflective efficiency can be restrained to the minimum.

In the retroreflective article according to the invention, preferably a ratio (R) of a distance r and a distance s expressed as follows:

$$R = r/s \quad \text{(expression 2)}$$

ranges from 0.4 to 0.95,
where r is a distance between two trapezoidal base lines (A-B and E1-D1 or A-B and E2-D2) forming an isosceles trapezoidal base plane of the retroreflective element, and s is a distance between the base line (A-B) and intersections (C1 and C2) of extended lines of other oblique lines (A-D1 and B-E1 and A-E2 and B-D2). When the ratio (R) of the distance r and the distance s ranges from 0.4 to 0.95, preferably from 0.5 to 0.9, the difference in area among the three reflective side faces (a1 plane, b1 plane, and c1 plane and a2 plane, b2 plane, and c2 plane) can be decreased.

Thus, in the cube corner retroreflective element of the invention having the trapezoidal base plane in which the portion of the apexes (C1 and C2) of the conventional triangular pyramidal cube corner retroreflective element is cut out by the trapezoidal base lines (D1-E1 and D2-E2), the retroreflective efficiency is slightly changed compared with the retroreflective efficiency of the triangular pyramidal cube corner retroreflective element which is not cut out.

According to the invention, a method for forming a triangular pyramidal cube corner retroreflective article in which a triangular pyramidal cube corner retroreflective element pair group is disposed in a closest-packed fashion on a common plane (S plane) defined by three base lines (A-B, B-C, and C-A), the each of retroreflective elements in a pair having one base line shared by the retroreflective elements in the pair, the triangular pyramidal cube corner retroreflective article including a first element pair group, in which two interior angles ($\alpha=\angle BAC$ and $\beta=\angle ABC$) formed by the shared base line (A-B) of the element pair and two other base lines (B-C and C-A) are different from each other and the element pair is line-symmetrically disposed in relation to the shared base line (A-B); and a second element pair group, in which the element pair is congruent to a line-symmetrical shape to the first element pair in relation to a line segment connecting vertexes (C1 and C2) of the base planes, the method comprising: forming the triangular pyramidal cube corner with a parallel groove group (x) and parallel groove groups (y1 and y2) wherein, a cross section of the parallel groove group (x) is formed in a substantially symmetrical V-shape, and a trajectory of a base portion of the parallel groove group (x) is formed in a straight line, and cross sections of the parallel groove groups (y1 and y2) are formed in a substantially symmetrical V-shape, and trajectories of base portions of the parallel groove groups (y1 and y2) are formed in a polygonal line.

The common plane (S plane) is a common base plane which is defined by three base line groups (A-B, B-C1, and C1-A; or A-B, B-C2, and C2-A) of many retroreflective element pair groups, and the base plane (ABC) of the retroreflective element is located on the common base plane.

The known conventional triangular pyramidal cube corner retroreflective element pair is rotational symmetry in relation to a midpoint of the shared base line (A-B). Accordingly, the optical axes of the two retroreflective elements included in the element pair are orientated toward directions rotated by 180 degrees relative to each other. In the triangular pyramidal cube corner retroreflective element having the base plane of the inequilateral triangle (inequilateral element), the optical axis is inclined in a direction perpendicular to the common base line (A-B). In the triangular pyramidal cube corner retroreflective element having three base lines of different lengths to one another (inequilateral element), although the optical axes are not perpendicular to the common base line (A-B), the optical axes have the same inclination angle in each element pair, and the optical axes are inclined in the directions rotated by 180 degrees relative to each other.

Based on the retroreflective theory of the cube corner retroreflective element, the retroreflective efficiency is improved in the azimuth in which the optical axis is inclined. Therefore, in the rotationally-symmetrical element pair, the azimuths in which the optical axes are inclined are always the directions rotated by 180 degrees relative to each other, and thus, the retroreflective efficiency is improved only in the inclined azimuth, while the retroreflective efficiency is slightly improved in other azimuths.

The triangular pyramidal cube corner retroreflective element of the invention includes the two types of retroreflective element pairs; the element pair group, in which the element pair is formed with the elements line-symmetrically disposed in relation to the shared base line (A-B); and another element pair group, in which the element pair is congruent to the line-symmetrical shape to the former element pair in relation to the vertexes (C1 and C2) of the base planes. Any element pair includes the inequilateral elements, and any element pair forms the line-symmetric element pair.

In the triangular pyramidal cube corner retroreflective article forming method according to the invention, preferably the linear parallel groove group (x) differs from the polygonal line parallel groove groups (y1 and y2) in a depth.

In the inequilateral retroreflective element in which the optical axis is not inclined, the ratio of the areas of the three reflective side faces (a1, b1, and c1 or a2, b2, and c2) is close to 1. On the other hand, in the retroreflective element having the inclined optical axis, the retroreflective efficiency is lowered because the areas of the reflective side faces are different from one another.

In order to solve the problem, when the optical axis is positively inclined, the linear parallel groove group (x) is formed deeper than the polygonal line parallel groove groups (y1 and y2) such that the areas of the three reflective side faces are equal to one another. When the optical axis is negatively inclined, the linear parallel groove group (x) is formed shallower than the polygonal line parallel groove groups (y1 and y2) such that the areas of the three reflective side faces are equal to one another. Therefore, the ratio of the areas of the three reflective side faces (a1, b1, and c1 or a2, b2, and c2) can be brought close to 1 to improve the retroreflective efficiency and the entrance angularity.

In the invention, preferably the polygonal line parallel groove groups (y1 and y2) differ from each other in the groove depth, and a following expression holds:

$$1.05 < h\mathrm{max}/h\mathrm{min} < 1.9$$

where hmax is the maximum depth of the grooves (x, y1, and y2) and hmin is the minimum depth. Accordingly, the retroreflective efficiency and the entrance angularity are improved.

In the triangular pyramidal cube corner retroreflective article forming method according to the invention, preferably the linear parallel groove group (x) has a V-shape, and a groove width (w) of the base portion ranges from 5 to 100 μm.

The triangular pyramidal cube corner retroreflective article forming method according to the invention is a method for forming the retroreflective article including the triangular pyramidal cube corner retroreflective element pair group by the parallel groove group (x) having substantially symmetrical V-shape cross section and the trajectory of the base portion exhibiting the straight line and the parallel groove groups (y1 and y2) each having substantially V-shape cross section and the trajectory of the base portion exhibiting a polygonal line. A groove width of the base portion is preferably provided in order that the tool can turn without affecting the shape of the groove group when the grove is bent.

In the triangular pyramidal cube corner retroreflective article forming method according to the invention, preferably the groove width of the base portion ranges from 5 to 100 μm, more preferably the groove width ranges from 15 to 50 μm. When the groove width is smaller than 5 μm, the working tool is hardly turned. When the groove width is larger than 100 μm, the retroreflective efficiency is deteriorated.

According to the invention, a method for forming a triangular pyramidal cube corner retroreflective element by alternatively disposing at least one of an element pair array A and an element pair array B is provided wherein, the triangular pyramidal cube corner retroreflective elements in a pair three base lines of different length and share one base line and the pair is in rotationally-symmetrical shape, the element pair array A is formed by arranging the element pair in such a manner that two base lines of the element pair share base lines of other element pair and one of other base line is aligned in one linear line, and the element pair array B is formed line-symmetrically in relation to the base lines which are aligned in one liner line.

The objective triangular pyramidal cube corner retroreflective element of the invention is the triangular pyramidal cube corner retroreflective article which is formed by disposing a triangular pyramidal cube corner retroreflective element pair group in a closest-packed fashion on a common plane (S plane) defined by three base lines (A-B, B-C, and C-A), the each of retroreflective elements in a pair having one base line (A-B) shared by the retroreflective elements in the pair, the triangular pyramidal cube corner retroreflective article includes a first element pair group, in which two interior angle ($\alpha=\angle BAC$ and $\beta=\angle ABC$) formed by the shared base line (A-B) of the element pair and two other base lines (B-C and C-A) are different from each other and the element pair is line-symmetrically disposed in relation to the shared base line (A-B); and a second element pair group, in which the element pair is congruent to a line-symmetrical shape to the former element pair in relation to a line segment connecting vertexes (C1 and C2) of a base plane.

The common plane (S plane) is a common base plane which is defined by three base line groups (A-B, B-C1, and C1-A or A-B, B-C2, and C2-A) of many retroreflective element pair groups, and the base plane (ABC) of the retroreflective element is located on the common base plane.

In the retroreflective element pair of the invention, the retroreflective elements form the line-symmetrical pair, then the inclination azimuths of the two optical axes of the element pair become symmetrical. The optical axes are formed in the four directions by combining the two types of the element pairs having different optical axes, so that the retroreflective performance can be improved in the wide range of azimuths.

The triangular pyramidal cube corner retroreflective element of the invention includes the two types of retroreflective element pairs; the element pair group, in which the element pair is formed with the elements line-symmetrically disposed in relation to the shared base line (A-B); and another element pair group, in which is the element pair is congruent to the line-symmetrical shape to the former element pair in relation to the vertexes (C1 and C2) of the base planes. Any element pair includes the inequilateral elements, and any element pair forms the line-symmetric element pair.

The method according to the invention is the method for forming the triangular pyramidal cube corner retroreflective element.

In the method according to the invention, in order to form the retroreflective element pair as the line-symmetrical pair, the thin plate PA in which a group of element pair arrays A is formed on the end portion thereof is rotated in a left-right direction to form a thin plate PB to form the element pair array B which is line-symmetrically formed in relation to the linearly-arrayed base lines of the element pair array A, and then at least one of the thin plate PA and the thin plate PB are alternatively laminated.

In the triangular pyramidal cube corner retroreflective element forming method according to the third aspect of the invention, preferably a thickness of the thin plate ranges from 50 to 10,000 µm. When the thickness of the thin plate is smaller than 50 µm, because a size of an opening of the formed triangular pyramidal cube corner retroreflective element is excessively small, the light flux retroreflected by the diffraction effect is excessively spread to lower the retroreflective brightness. When the thickness of the thin plate is larger than 10,000 µm, the thin, flexible prism retroreflective sheet is hardly formed. It is not always necessary to keep the thickness of the thin plate constant, but two or more thin plates having different thickness may be combined.

In the triangular pyramidal cube corner retroreflective element forming method according to the third aspect of the invention, preferably a material of the thin plate is one of a metal thin plate, a plastic thin plate, a ceramic thin plate, and a glass thin plate.

In the triangular pyramidal cube corner retroreflective element forming method according to the third aspect of the invention, when the metal thin plate is used as the thin plate, preferably the metal thin plate is selected from one of a copper alloy such as brass, nickel, copper, phosphor bronze, and oxygen-free copper, stainless steel, and aluminum, because a tolerance can correctly be maintained in these dimensionally stable materials. Particularly, from the viewpoint of workability, preferably the metal thin plate is selected from one of the copper alloy such as brass, nickel, copper, phosphor bronze, and oxygen-free copper and the stainless steel.

In the invention, when the plastic thin plate is used as the thin plate, the thin plate made of a specific material, that is, a synthetic resin having Rockwell hardness (JIS 22245) of 70 or more, preferably 75 or more is preferably used in order to improve a problem that the thin plate is strained due to a lack of strength in cutting the V-groove.

In addition to the Rockwell hardness of 70 or more, the thin plate is made of a thermoplastic or thermosetting synthetic resin having a softening point of 150° C. or more, preferably 200° C. or more, because such troubles that the accurate cutting is hardly performed by softening the thin plate during the cutting are not generated.

Examples of the synthetic resin include a polyethylene terephthalate resin, a polybuthylene terephthalate resin, a polycarbonate resin, a polymethyl methacrylate resin, a polyimide resin, a polyallylate resin, a polyether sulfone resin, a polyether imide resin, and cellulose triacetate resin. Among others, from the viewpoints of ready availability and forming property, preferably the plastic thin plate is selected from one of the polyethylene terephthalate resin, the polymethyl methacrylate resin, and the polycarbonate resin.

In the triangular pyramidal cube corner retroreflective element forming method according to the invention, preferably the ceramic thin plate is selected from one of an alumina, a silicon nitride, a steatite, zircon, quartz, sapphire, optical glass, and quartz glass. Such material has high mechanical strength, the high heat-resistant property, and the excellent thermal properties such as the small thermal expansion are selected for the ceramic thin plate.

In the triangular pyramidal cube corner retroreflective element forming method according to the invention, preferably a metal plating layer whose thickness is larger than a height of the triangular pyramidal cube corner element is formed on the end-face integrated plane after many thin plates are laminated, and parallel V-groove groups are formed from three directions on the metal plating layer in order to prevent the strain or displacement of the thin plate in forming the V-groove group.

In the triangular pyramidal cube corner retroreflective element forming method according to the third aspect of the invention, preferably the formed metal plating layer is made of one of copper, nickel, and a nickel-phosphorus alloy in order to prevent the deformation, strain, displacement, or thermal expansion in forming the V-groove.

Accordingly, the invention can provide the retroreflective sheet in which the three brightness characteristics, that is, the entrance angularity, the observation angularity, and the rotation angularity are improved, particularly the rotation angularity is improved, and the producing method thereof.

BRIEF DESCRIPTION OF EMBODIMENTS

A multidirectional retroreflective article according to a preferred embodiment of the invention will be described below with reference to the drawings.

FIG. 1A is a plan view and FIG. 1B is a sectional view respectively showing an inequilateral element pair of a conventional technique. Two elements forming the inequilateral element pair have a rotationally-symmetric shape in relation to a midpoint (O) of a shared base line (A-B). In the inequilateral element pair, optical axes are disposed in opposite directions, that is, 180 degrees away, while each of the optical axes does not have an azimuth angle of 0 degree or 180 degrees.

Figure 1:
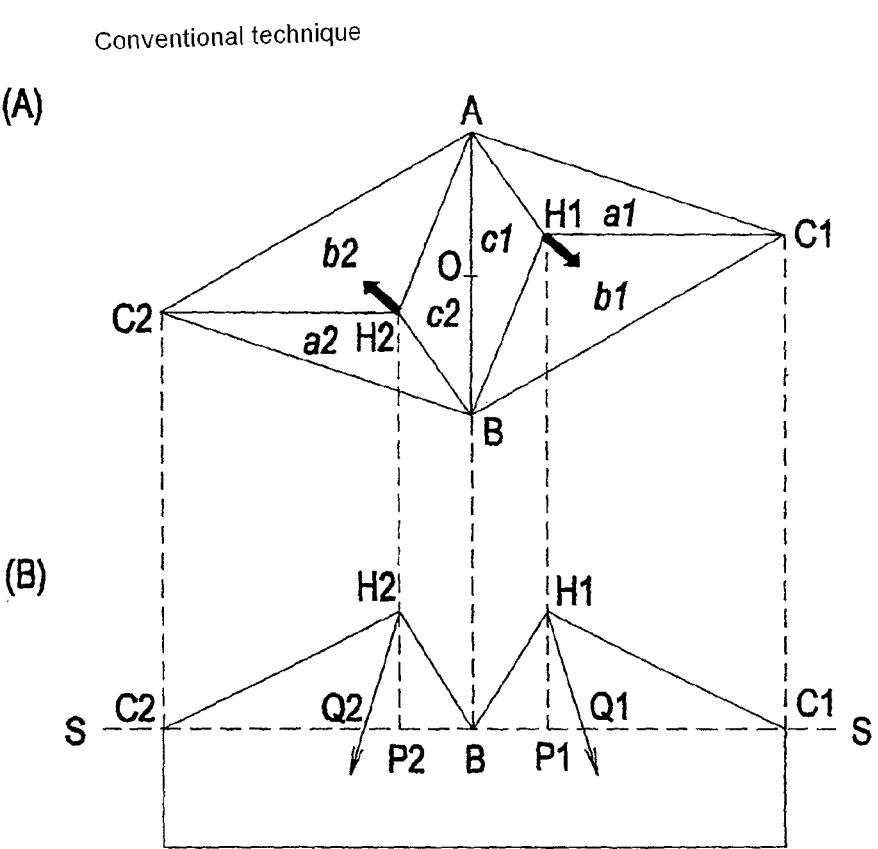
FIG. 1 shows a triangular pyramidal cube corner element pair of a conventional technique.
Figure 2:
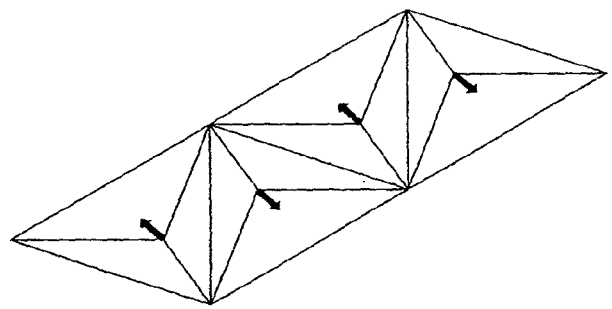
FIG. 2 shows a triangular pyramidal cube corner element group of the conventional technique.

FIG. 2 shows the inequilateral element pair of FIG. 1 and another inequilateral element pair adjacent thereto. The optical axes of both the element pairs are inclined in the same direction.

Figure 3:
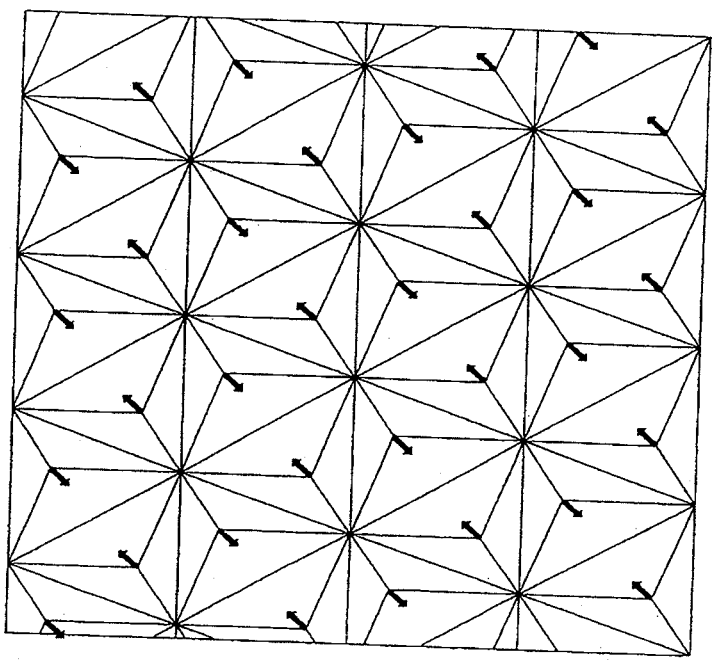
FIG. 3 shows the triangular pyramidal cube corner element group of the conventional technique.

FIG. 3 shows a set of inequilateral element pairs of the conventional technique of FIGS. 1 and 2. All the element pairs are formed by the rotationally-symmetrical element pair, and the optical axes of all the element pairs are inclined in the same direction. In such element groups, although the retroreflective performance is improved in the direction in which the optical axis is inclined, the retroreflective optical axis performance is not improved in other directions, particularly in an azimuth of 45 degrees relative to the direction in which the optical axis is inclined. The problem significantly emerges in a negatively-inclined element of the conventional retroreflective elements.

Figure 4:
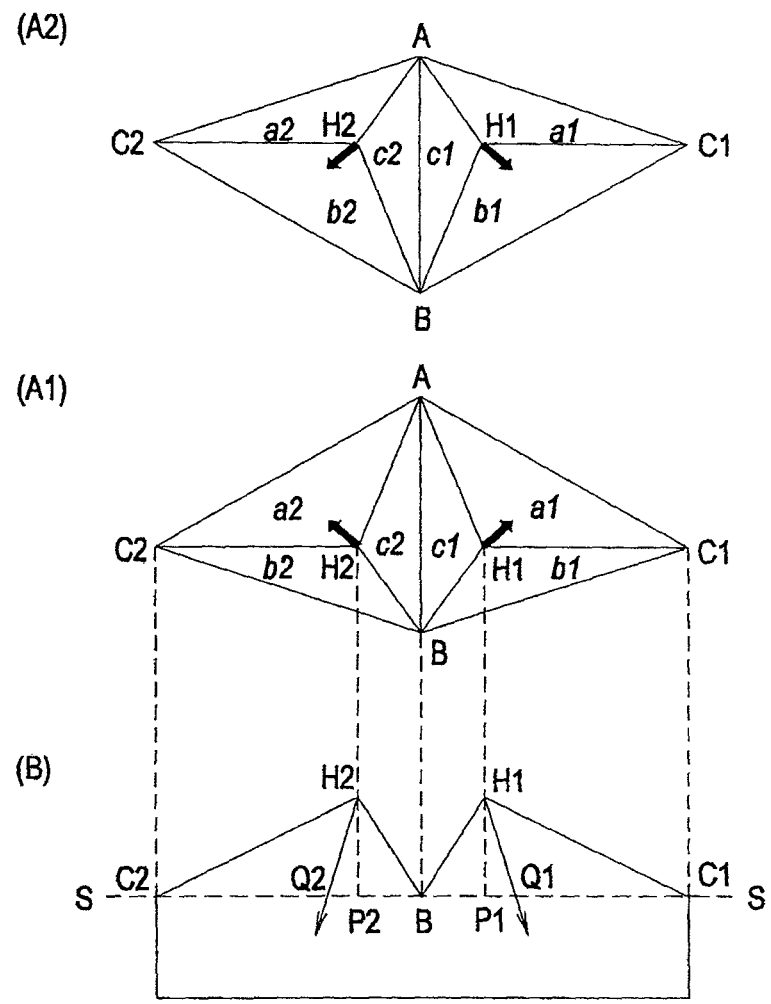
FIG. 4 shows a multidirectional element pair of the invention.

FIG. 4 shows a retroreflective element pair of the invention. The element pair of the invention is formed by a first element pair (A1) and a second element pair (A2), which is line-symmetrical to the first element pair (A1). All the element pairs are inequilateral elements whose base planes are of inequilateral triangular shapes. The element pair is line-symmetrical in relation to a shared base line (A-B). All the base lines (A-B, B-C, and C-A) are located on a common plane (S plane).

An azimuth angle ($\theta a$) of the optical axis in the element of FIG. 4 ranges from 5 to 85 degrees, preferably from 25 to 65 degrees, more preferably from 40 to 50 degrees, and most preferably from 43 to 47 degrees. The optical axis inclines in a direction away from the shared baseline (A-B). An inclination angle ($\theta$) of the optical axis ranges from 0.5 to 25 degrees, preferably from 3 to 15 degrees, more preferably from 4 to 8 degrees.

Figure 5:
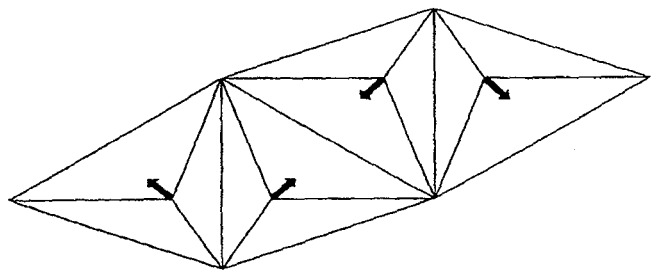
FIG. 5 shows a multidirectional element group of the invention.

FIG. 5 shows the state in which the two element pairs of the invention of FIG. 4 are disposed to share a base line. As shown in FIG. 5, four optical axes are disposed in directions different from one another, and the azimuths of the optical axes are line-symmetrical to each other.

Figure 6:
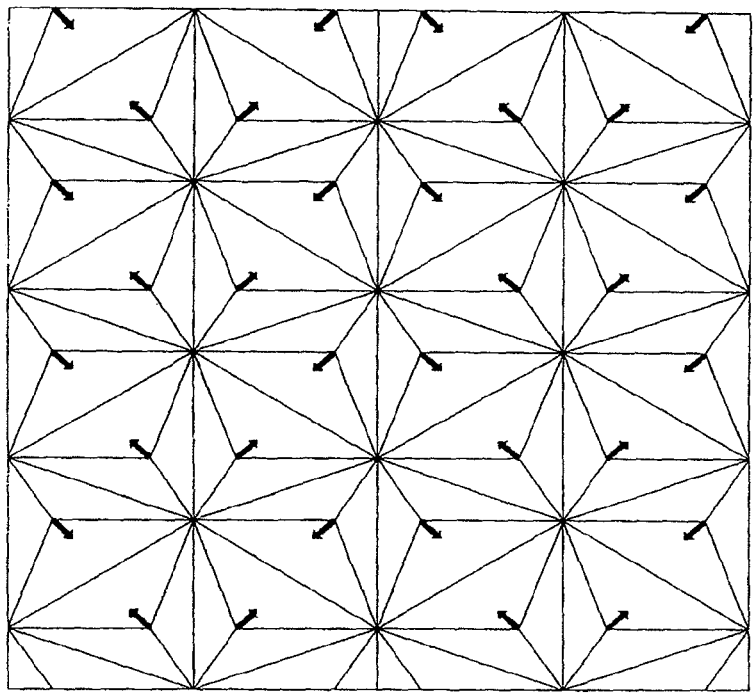
FIG. 6 shows multidirectional element group of the invention.

FIG. 6 shows a set of retroreflective element pairs of the invention of FIGS. 4 and 5. As shown in FIG. 6, the four optical axes are disposed in directions different from one another, and the azimuths of the optical axes are line-symmetrical to each other.

Figure 7:
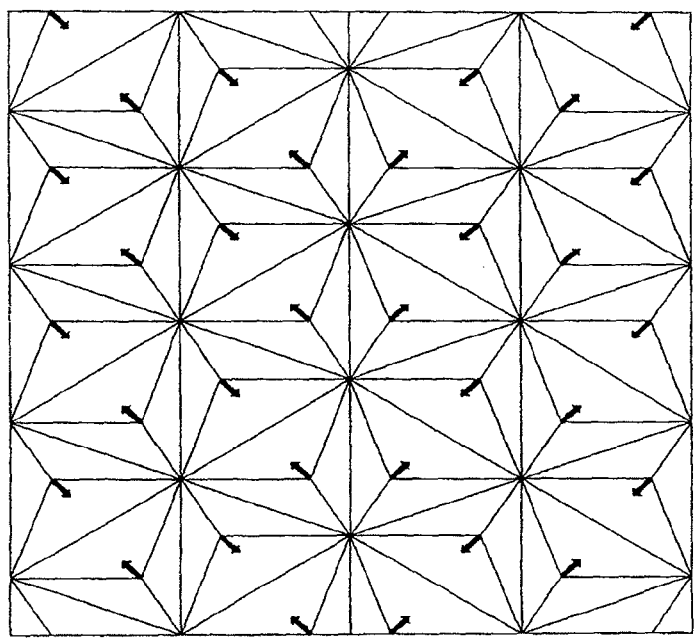
FIG. 7 shows the multidirectional element group of the invention.

FIG. 7 shows a retroreflective element group of the invention. In the FIG. 7, every adjacent two columns of the element array are formed in a pair. Such arrangement allows reducing the number of folding points and thus is preferable for the invention.

Figure 8:
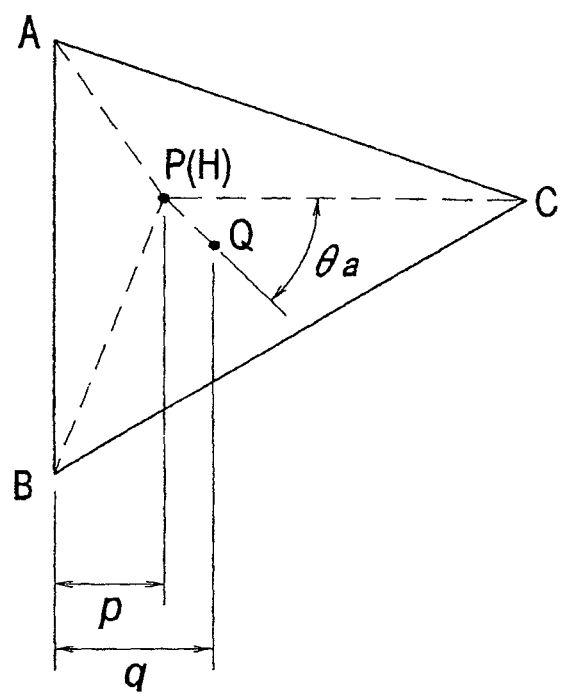
FIG. 8 shows the multidirectional element pair of the invention.

FIG. 8 shows a relationship between the inclination angle ($\theta$) and the azimuth angle ($\theta a$) of the optical axis in one element pair included in the retroreflective element pair of the invention. The inclination angle ($\theta$) of the optical axis is indicated by $\angle HPQ$. The azimuth angle ($\theta a$) of the optical axis is indicated by an angle ($\angle CPQ$) formed by a line segment (C-P) and a line segment (P-Q). The line segment (C-P) is formed by a vertex (C) of a base plane triangle (ABC) and an intersection (P)

In the invention, the azimuth angle ($\theta a$) of the optical axis corresponds to a concept that the inclination direction of the optical axis in the isosceles element becomes positive or negative. In the known conventional isosceles element, the positive inclination means that the optical axis is inclined in the opposite direction to the shared base line (A-B), and the negative inclination means that the optical axis is inclined in the direction of the shared base line (A-B).

Regarding to the element of the invention, an element with the azimuth angle ($\theta a$) ranging from −90 to 90 degrees has the optical axis inclined in the opposite direction to the shared base line (A-B), whilst an element with the azimuth angle ($\theta a$) ranging from 90 to 270 degrees has the optical axis inclined in the direction of the shared base line (A-B). Here, an element with the azimuth angle ($\theta a$) of 0 degree is a positively-inclined isosceles element, and an element with the azimuth angle ($\theta a$) of 180 degrees is a negatively-inclined isosceles element.

The relationship will be described with reference to FIG. 8. In the element of the invention, assuming that p is a distance between the base line (A-B) and the intersection P and q is a distance between the base line (A-B) and the point Q, (q-p) becomes positive in the element with azimuth angle ($\theta a$) ranging from −90 to 90 degrees, and (q-p) becomes negative in the element with azimuth angle ($\theta a$) ranging from 90 to 270 degrees.

Figure 9:
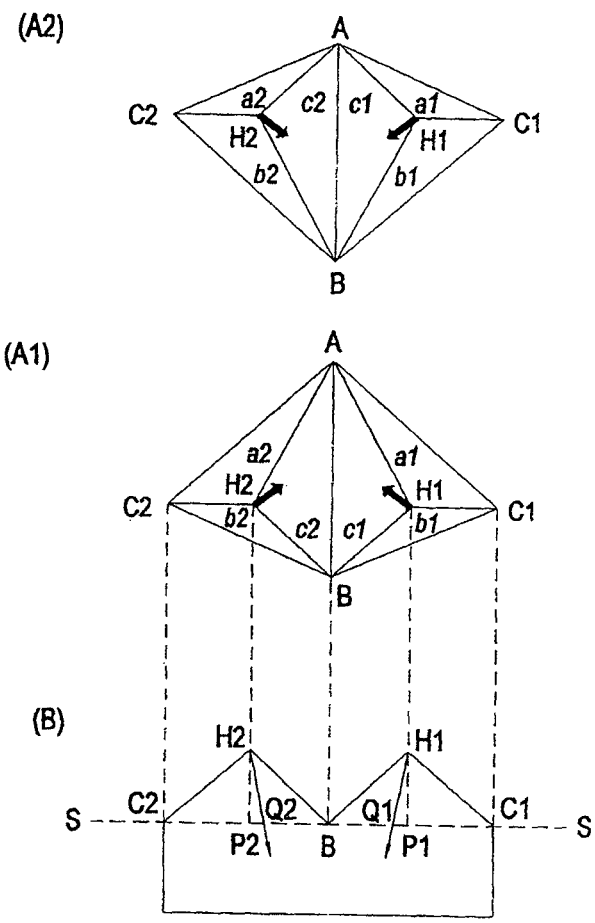
FIG. 9 shows the multidirectional element group of the invention.

FIG. 9 shows a retroreflective element pair of another aspect of the invention. The element pair of the invention of FIG. 8 includes a first element pair (A1) and a second element pair (A2), which is line-symmetrical thereto. All the element pairs are formed by inequilateral elements whose base planes have inequilateral triangular shapes. The element pair is line-symmetrical in relation to a shared base line (A-B).

The azimuth angle ($\theta a$) of the optical axis in the element of FIG. 9 ranges from 95 to 175 degrees, preferably from 115 to 155 degrees, more preferably from 130 to 140 degrees, and most preferably from 133 to 137 degrees. The optical axis inclines in the direction of the shared base line (A-B). The inclination angle ($\theta$) of the optical axis ranges from 0.5 to 25 degrees, preferably from 3 to 15 degrees, more preferably from 4 to 8 degrees.

Figure 10:
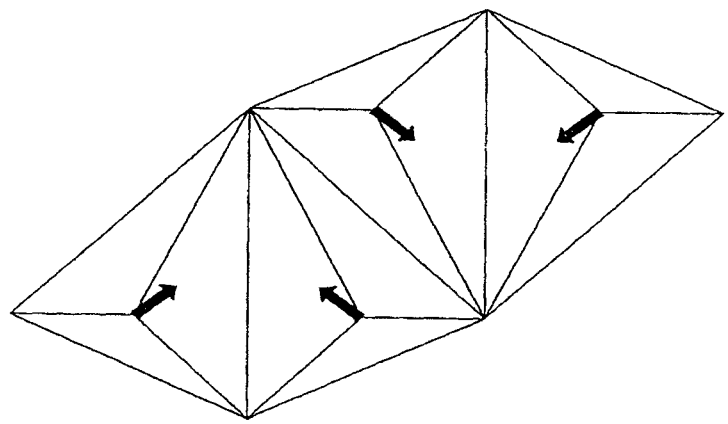
FIG. 10 shows a multidirectional element group of the invention.

FIG. 10 shows the state in which the two element pairs of the invention of FIG. 9 are disposed to share a base line. As shown in FIG. 10, four optical axes are disposed in directions different from one another, and the azimuths of the optical axes are line-symmetrical to each other.

Figure 11:
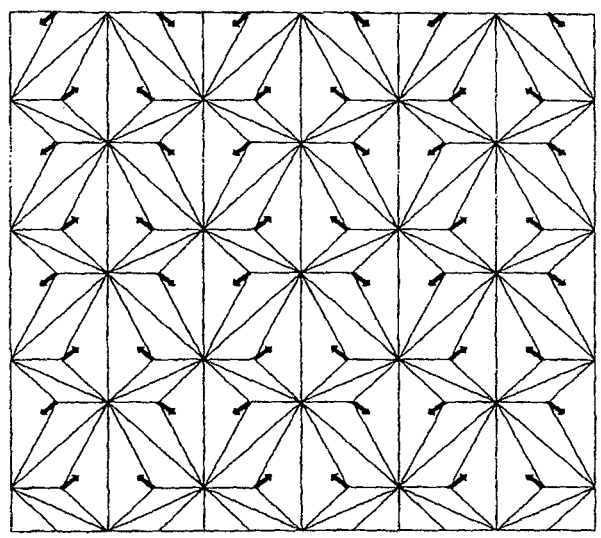
FIG. 11 shows a method for producing the multidirectional element group of the invention.

FIG. 11 shows a set of retroreflective element pairs of the invention of FIGS. 9 and 10. As shown in FIG. 11, the four optical axes are disposed in directions different from one another, and the azimuths of the optical axes are line-symmetrical to each other.

Figure 12:
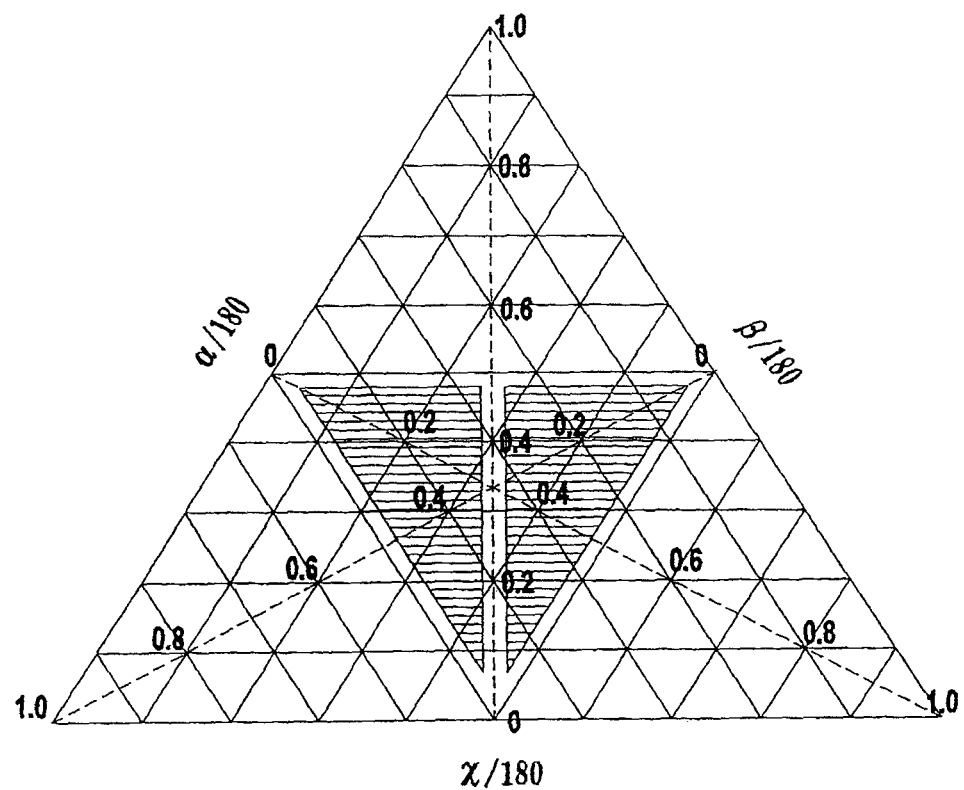
FIG. 12 shows a region defining a shape of a retroreflective element of the invention.

FIG. 12 shows that, when values ($\alpha/180°$, $\beta/180°$, $\chi/180°$) respectively obtained by dividing three internal angles $\alpha(\angle BAC)$, $\beta(\angle ABC)$, and $\chi(\angle ACB)$ of the retroreflective element by 180° are shown in a triangular coordinate, the values ($\alpha/180°$, $\beta/180°$, $\chi/180°$) exist in one of a first region surrounded by (0.250, 0.275, 0.475), (0.450, 0.475, 0.075), and (0.050, 0.475, 0.475) and a second region surrounded by (0.275, 0.250, 0.475), (0.475, 0.450, 0.075), and (0.475, 0.050, 0.475).

Figure 13:
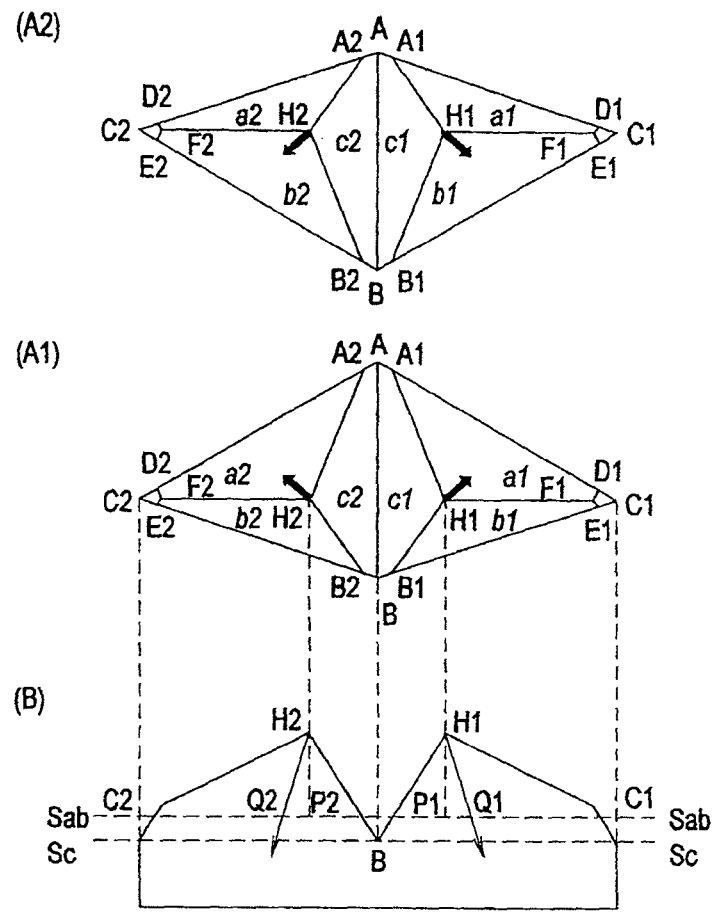
FIG. 13 shows a multidirectional element pair of the invention.

FIG. 13 shows a retroreflective element pair of a preferable aspect of the invention. The element pair of FIG. 13 includes the first element pair (A1) and the second element pair (A2), which is line-symmetrical thereto. All the element pairs are formed by inequilateral elements whose base planes have inequilateral triangular shapes. The element pair is line-symmetrical in relation to a shared base line (A-B). As shown in the sectional view of FIG. 13B1, the two optical axes of the element pair are inclined in the direction away from each other with respect to the base plane (A-B).

In the first element pair (A1) and second element pair (A2) of FIG. 13, the base line (A-B) of the reflective side faces (c1 and c2) is located on the common plane (Sc plane), and the base lines (A-C1 and A-C2) of the reflective side faces (a1 and a2) and the base lines (D1-B1 and D2-B2) of the reflective side faces (b1 and b2) are located on the common plane (Sab plane).

The common plane (Sc plane) is located deeper than the common plane (Sab plane), and the height (hc) is larger than the heights (hb and ha). Therefore, the area of the reflective side face (c1) becomes large.

Figure 14:
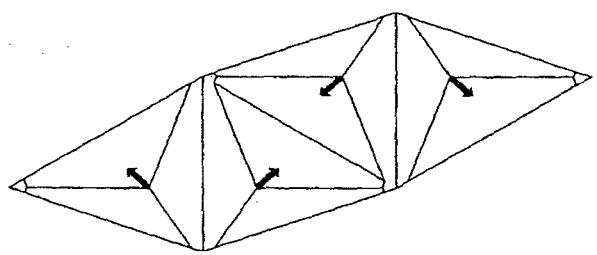
FIG. 14 shows a multidirectional element group of the invention.

FIG. 14 shows the state in which two element pairs of the invention of FIG. 13 are disposed to share the base line. As shown in FIG. 13, four optical axes are disposed in directions different from one another, and the azimuths of the optical axes are line-symmetrical to each other.

Figure 15:
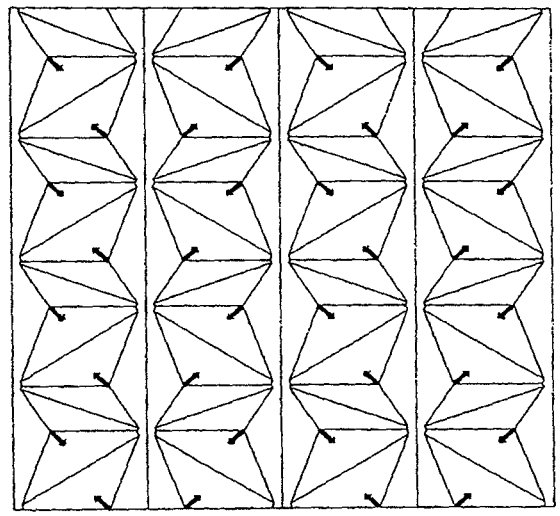
FIG. 15 shows a multidirectional element group of the invention.

FIG. 15 shows a set of retroreflective element pairs of the invention of FIGS. 13 and 14. As shown in FIG. 6, the four optical axes are disposed in directions different from one another, and the azimuths of the optical axes are line-symmetrical to each other.

Figure 16:
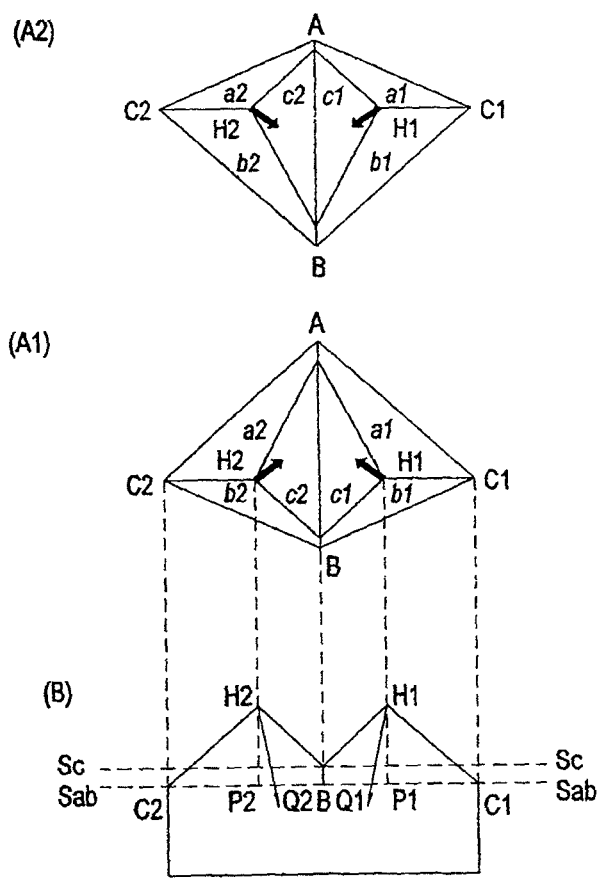
FIG. 16 shows a multidirectional element pair of the invention.

FIG. 16 shows a retroreflective element pair of another aspect of the invention. The element pair of FIG. 16 includes the first element pair (A1) and the second element pair (A2), which is line-symmetrical thereto. All the element pairs are formed by inequilateral elements whose base planes have inequilateral triangular shapes. The element pair is line-symmetrical in relation to a shared base line (A-B). As shown in the sectional view of FIG. B1, the two optical axes of the element pair are inclined toward to each other with respect to the base plane (A-B).

In the first element pair (A1) and second element pair (A2) of FIG. 16, the base line (A-B) of the reflective side faces (c1 and c2) is located on the common plane (Sc plane), and the base lines (A-C1 and A-C2) of the reflective side faces (a1 and a2) and the base lines (D1-B1 and D2-B2) of the reflective side faces (b1 and b2) are located on the common plane (Sab plane).

The common plane (Sc plane) is located shallower than the common plane (Sab plane), and the height (hc) is smaller than the heights (hb and ha). Therefore, the area of the reflective side face (c1) is reduced.

Figure 17:
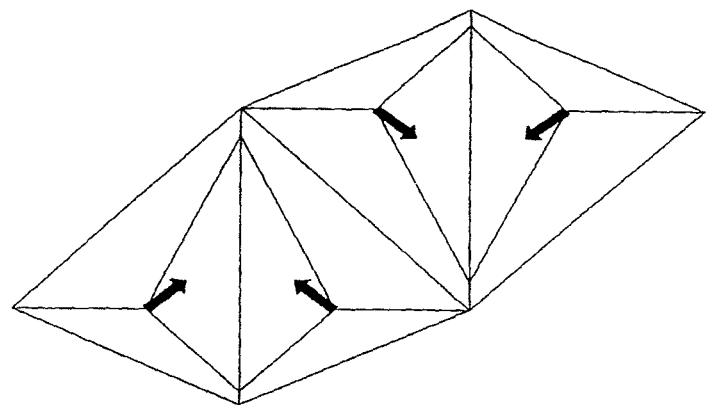
FIG. 17 shows a multidirectional element group of the invention.
Figure 18:
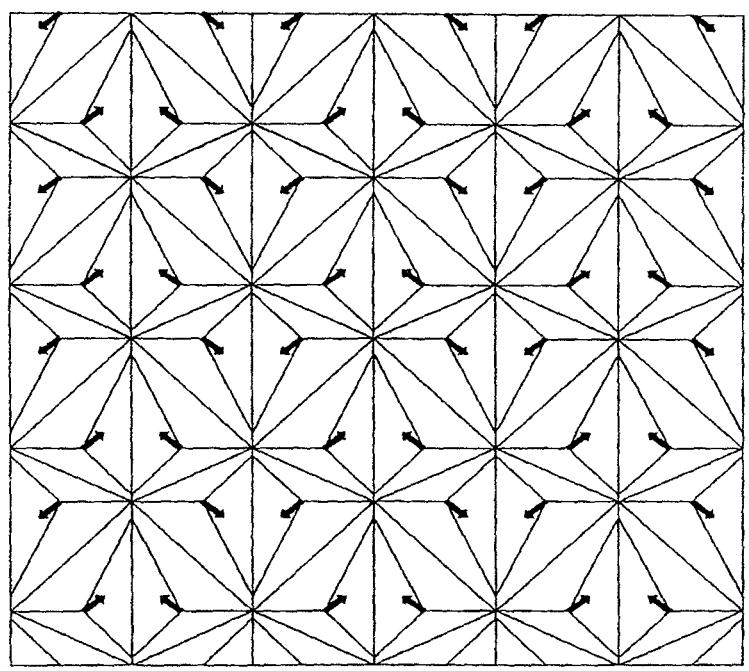
FIG. 18 shows a multidirectional element group of the invention.

FIG. 17 shows the state in which two element pairs of the invention of FIG. 18 are disposed to share the base line. As shown in FIG. 17, four optical axes are disposed in directions different from one another, and the azimuths of the optical axes are line-symmetrical to each other.

FIG. 18 shows a set of retroreflective element pairs of the invention of FIGS. 16 and 17. As shown in FIG. 18, the four optical axes are disposed in directions different from one another, and the azimuths of the optical axes are line-symmetrical to each other.

Figure 19:
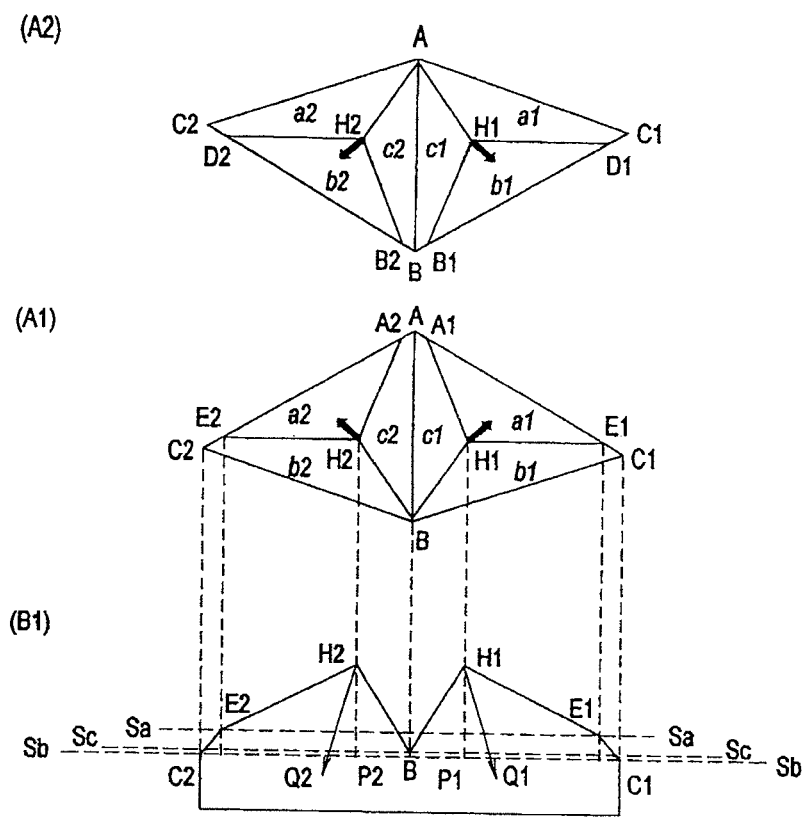
FIG. 19 shows a multidirectional element pair of the invention.

FIG. 19 shows a retroreflective element pair of another preferable aspect of the invention. The element pair of FIG. 19 includes the first element pair (A1) and the second element pair (A2), which is line-symmetrical thereto. All the element pairs are formed by inequilateral elements whose base planes have inequilateral triangular shapes. The element pair is line-symmetrical in relation to a shared base line (A-B). As shown in the sectional view of FIG. B1, the two optical axes of the element pair are inclined away from each other with respect to the base plane (A-B).

In the first element pair (A1) and second element pair (A2) of FIG. 19, the base line (A-B) of the reflective side faces (c1 and c2) is located on the common plane (Sc plane), the base lines (A-C1 and A-C2) of the reflective side faces (a1 and a2) are located on the common plane (Sa plane), and the base lines (D1-B1 and D2-B2) of the reflective side faces (b1 and b2) are located on the common plane (Sab plane).

The common plane (Sc plane), the common plane (Sa plane), and the common plane (Sb plane) differ from one another in the depth. Accordingly, the height (hc), the height (hb), and the height (ha) are not equal to one another. The height (hc), the height (hb), and the height (ha) are selected such that the areas of the three reflective side faces (a1, b1, and c1; and a2, b2, and c2) are substantially equal to one another. The inequilateral element in which the three common planes (Sc plane, Sb plane, and Sa plane) differ from one another in the depths has areas of the reflective side faces (a1, b1, and c1 and a2, b2, and c2) substantially equal to one another and thus has excellent retroreflective efficiency.

Figure 20:
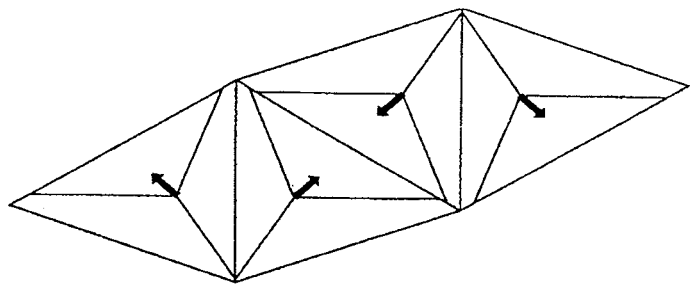
FIG. 20 shows a multidirectional element group of the invention.

FIG. 20 shows the state in which two element pairs of the invention of FIG. 19 are disposed to share the base line. As shown in FIG. 19, four optical axes are disposed in directions different from one another, and the azimuths of the optical axes are line-symmetrical to each other.

Figure 21:
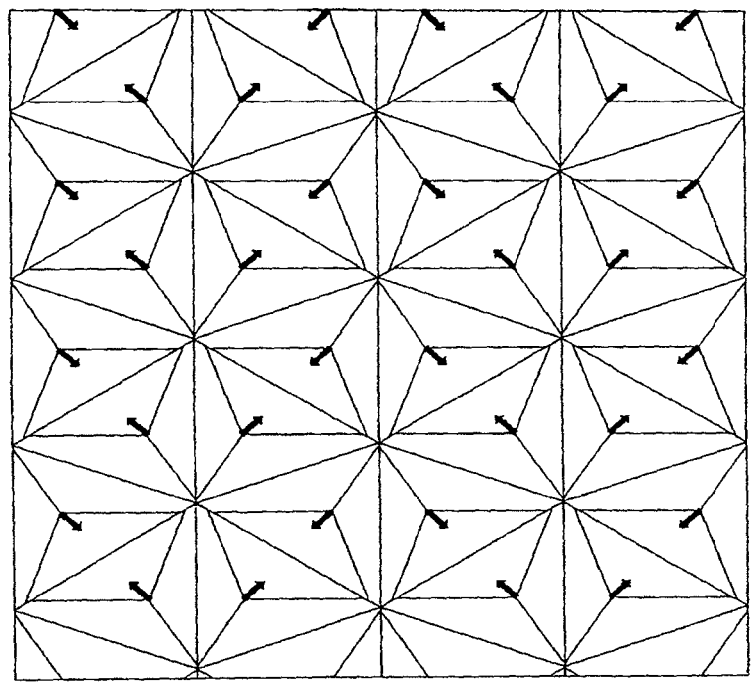
FIG. 21 shows a multidirectional element group of the invention.

FIG. 21 shows a set of retroreflective element pairs of the invention of FIGS. 19 and 20. As shown in FIG. 21, the four optical axes are disposed in the directions different from one another, and the azimuths of the optical axes are line-symmetrical to each other. Therefore, the even retroreflective performance is provided for any azimuth to show the excellent rotation angularity.

Figure 22:
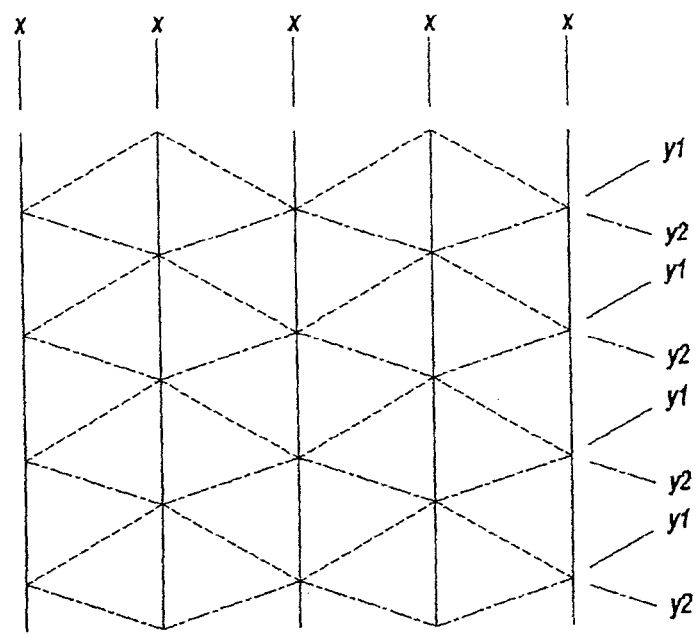
FIG. 22 shows a trajectory of a base line in the multidirectional element group of invention.

FIG. 22 shows that the trajectory of the V-shape groove forming the retroreflective element is substantially formed by V-shape grooves (x, y1, and y2) in the set of retroreflective element pairs of FIG. 6. The V-shape grooves x form a group of parallel straight lines located at equal intervals. The grooves y1 and y2 are formed by polygonal line groups, and the grooves y1 and y2 are located at equal intervals.

Figure 23:
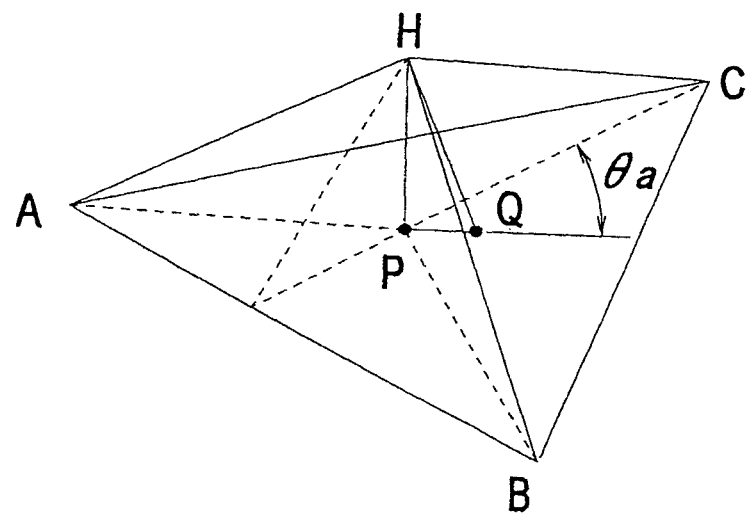
FIG. 23 shows the multidirectional element pair of the invention.

FIG. 23 is a cubic diagram showing one element of an element pair of the invention forming the line-symmetrical pair. The base plane (ABC) is formed by the three base lines (A-B, B-C, and C-A) with two interior angles ($\alpha = \angle BAC$ and $\beta \angle ABC$) formed by the shared base line (A-B) and other two base lines (B-C and C-A) different from each other. Assuming that P is an intersection of the base plane with a perpendicular drawn from the vertex (H) of the retroreflective element to the base plane (ABC), and assuming that Q is an intersection of the base plane with and the optical axis, the azimuth angle ($\theta a$) of the optical axis can be indicated by $\angle CPQ$.

In the retroreflective element of FIG. 23, the reflective side faces (ABH, BCH, and AH) have cube corner shapes with prism vertex angles substantially perpendicular to one another.

Figure 24:
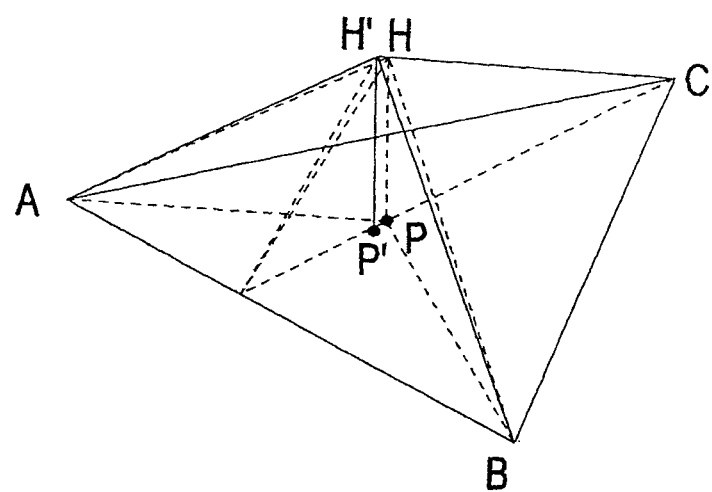
FIG. 24 is a cubic diagram showing a multidirectional element pair of the invention.

FIG. 24 shows a retroreflective element of an aspect of the invention in which the observation angularity is improved.

Referring to FIG. 24, a reflective side face (ABH') is formed with an angle which is slightly different from that of a theoretical reflective side face (ABH) forming a perpendicular (HP), and the reflective side face (ABH') has a slight vertex angle deviation with respect to an intersecting angle with other reflective side faces. Although only one reflective side face is deviated in FIG. 23, it is preferable that other reflective side faces are also deviated.

Assuming that Vx, Vy1, and Vy2 are theoretical V-groove angles with which the prism vertex angles (Pab, Pbc, and Pca) become 90 degrees when the retroreflective element is formed by V-shape grooves (x, y1, and y2) having a cross section in substantially V-shape, it is preferable that a V-groove angle in at least one of the directions has a deviation (dVx, dVy1, or dVy2) of ±(0.1 to 20) min, and more preferable of ±(0.2 to 10) min in order to form the retroreflective element having the vertex angle deviation shown in FIG. 24.

Figure 25:
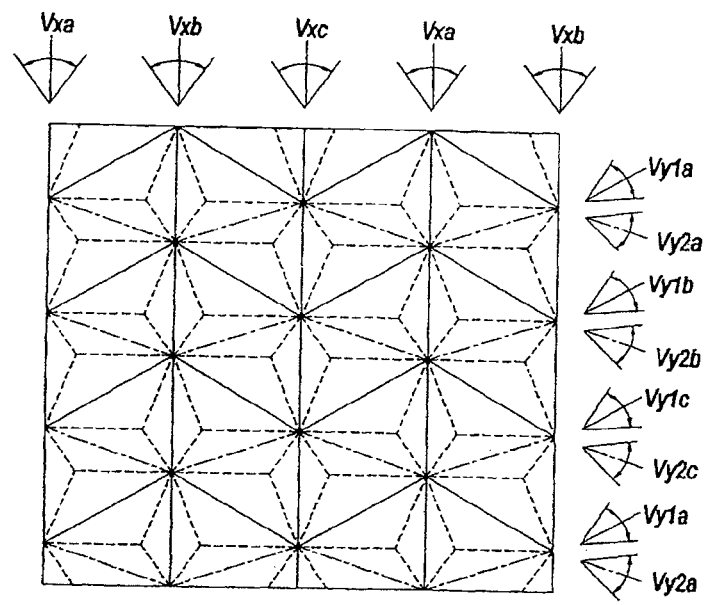
FIG. 25 shows a multidirectional element group of the invention.

FIG. 25 shows a state where the V-groove angle in at least one of the directions of the V-shape grooves (x, y1, and y2) is formed to have at least two kinds of deviations alternatively in the method for forming the retroreflective element having the vertex angle deviation shown in FIG. 24. Referring to FIG. 25, the grooves x are formed in the V-shape groove having the V-groove angle of three types (Vxa, Vxb, and Vxc) alternatively. The grooves y1 are also formed in the V-shape groove having the V-groove angle of three types (Vy1$a$, Vy1$b$, and Vy1$c$) alternatively, and the grooves y2 are also formed in the V-shaped groove having the V-groove angle of three types (Vy2$a$, Vy2$b$, and vy2$c$).

Figure 26:
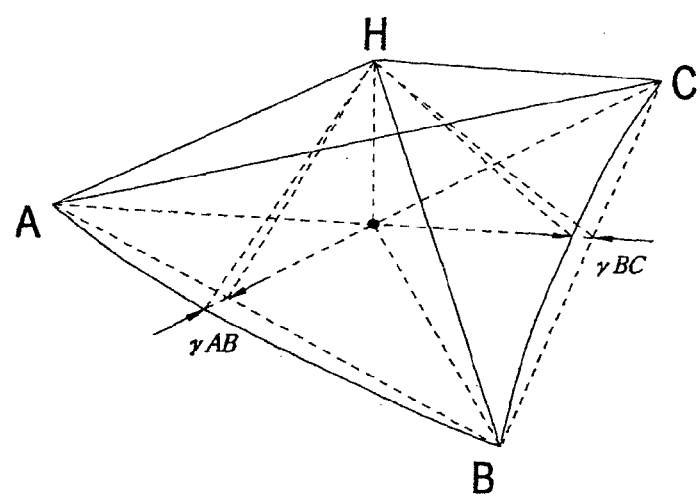
FIG. 26 is a cubic diagram showing a multidirectional element pair of the invention.

FIG. 26 shows a retroreflective element of another aspect of the invention having an improved observation angularity.

Referring to FIG. 26, the trajectory of the base portion of the groove in at least one of the direction of the V-shape grooves (x, y1, and y2) forming the retroreflective element is formed as a non-linear base line, which does not form a straight line.

Assuming that L is a length of an end-to-end straight line connecting both ends of the non-linear base line, it is preferable that a non-linear factor (γAB, γBC, or γCA, not shown) ranges from 0.0001 L to 0.05 L, where the non-linear factor (γAB, γBC, or γCA) is defined as a maximum distance between the intersection of a perpendicular from the end-to-end straight line with the non-linear base line and the end-to-end straight line.

Preferably, the trajectory of the non-linear base line is expressed by a curved line selected from an arc, a trigonometric function (sine curve, cosine curve, and tangent curve), an inverse trigonometric function, an elliptical function, a hyperbolic function, and a combination thereof.

Figure 27:
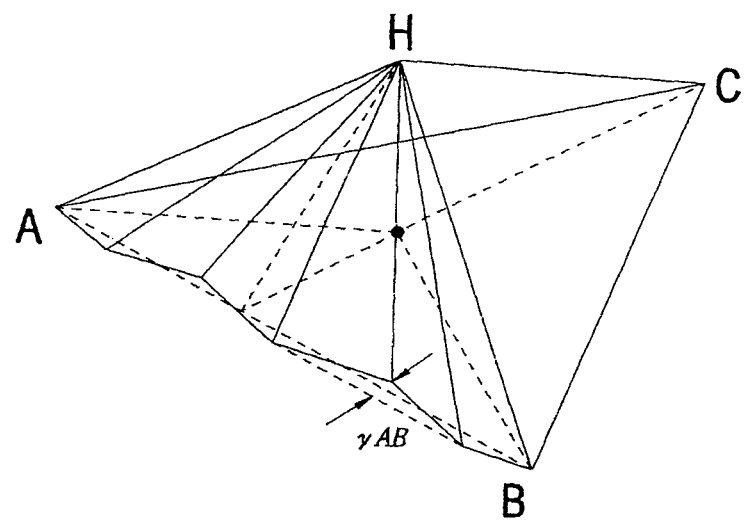
FIG. 27 is a cubic diagram showing a multidirectional element pair of the invention.

Alternatively, as shown in FIG. 27, the trajectory of the non-linear base line may be expressed by a polygonal line in which straights lines are combined.

Figure 28:
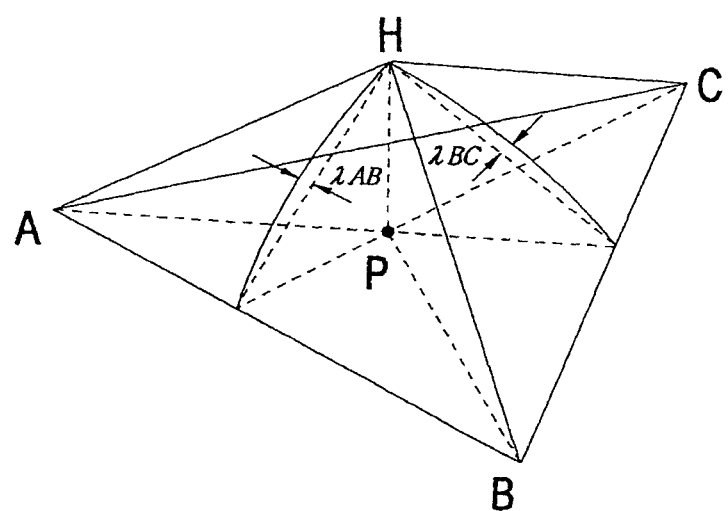
FIG. 28 is a cubic diagram showing a multidirectional element pair of the invention.

FIG. 28 shows a retroreflective element of another aspect of the invention in which the observation angularity is improved.

FIG. 28 shows the retroreflective element having the non-linear cross section in which the cross sectional shape of at least one of the V-groove angles of the V-shape grooves (x, y1, and y2) does not form a straight line. The reflective side face (ABH) of the retroreflective element shown in FIG. 28 does not form a flat surface but a curved surface.

Assuming that G is a length of an end-to-end straight line connecting both ends of the non-linear cross section, preferably a non-linear factor (γAB, γBC, or Γca: not shown) ranges from 0.0001 G to 0.05 G, where the non-linear factor (γAB, γBC, or Γca, not shown) is defined as the maximum distance between the end-to-end straight line and the intersection of a perpendicular from the end-to-end straight line with the non-linear cross section and the end-to-end straight line.

The non-linear cross section may be formed by a curved line selected from an arc, a trigonometric function (sine curve, cosine curve, and tangent curve), an inverse trigonometric function, an elliptical function, a hyperbolic function, and a combination thereof.

Figure 29:
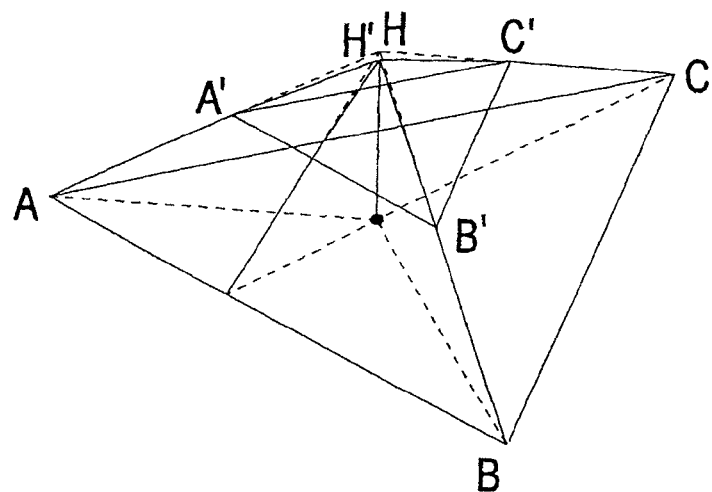
FIG. 29 is a cubic diagram showing a multidirectional element pair of the invention.

Alternatively, as shown in FIG. 29, the non-linear cross section may be formed by a polygonal line in which straights lines are combined. In such retroreflective elements, the reflective side face does not form one flat surface, but forms a polyhedron (ABB'C and A'B'H').

Figure 30:
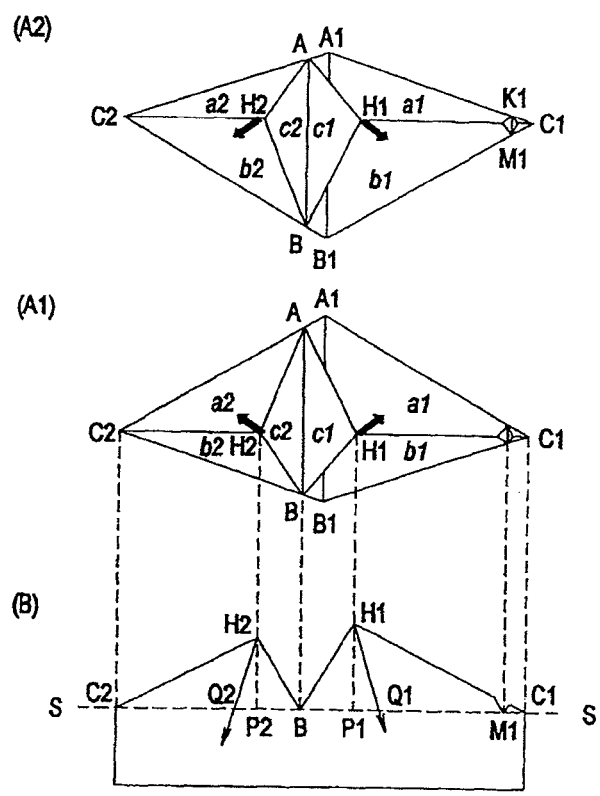
FIG. 30 shows a retroreflective element pair of the invention.

FIG. 30 shows a retroreflective element pair of the invention. The shared base line (A-B) of the element pair included in the first element pair group does not pass through intersections (A1 and B1) of other two pairs of base lines (B-C1 and C1-A; and B-C2 and C2-A), a base plane of one of the elements is formed into a pentagon (A-A1-C1-B1-B), a base plane of the other element is formed into a triangle (A-C2-B), elements in an element pair included in the first element pair group have different height (h1, h2) and the element pair included in the second element pair group is congruent to a line-symmetrical shape to the first element pair in relation to a line segment connecting the vertexes (C1 and C2) of the base plane.

In the invention, it is preferable that the distance (offset amount) between the line segment (A1 and B1) and the line segment (A and B) can be set in the range of ±(2 to 20) % of the distance of the vertexes (C1 and C2) of the base plane of the element pair in order to improve angularity.

Figure 31:
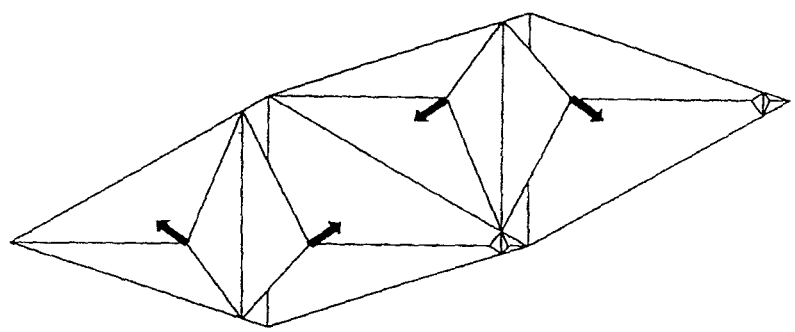
FIG. 31 shows a retroreflective element group of the invention.

FIG. 31 shows the state in which the two element pairs of the invention of FIG. 5 are disposed to share the base line. As shown in FIG. 5, four optical axes are disposed in directions different from one another, and the azimuths of the optical axes are line-symmetrical to each other.

Figure 32:
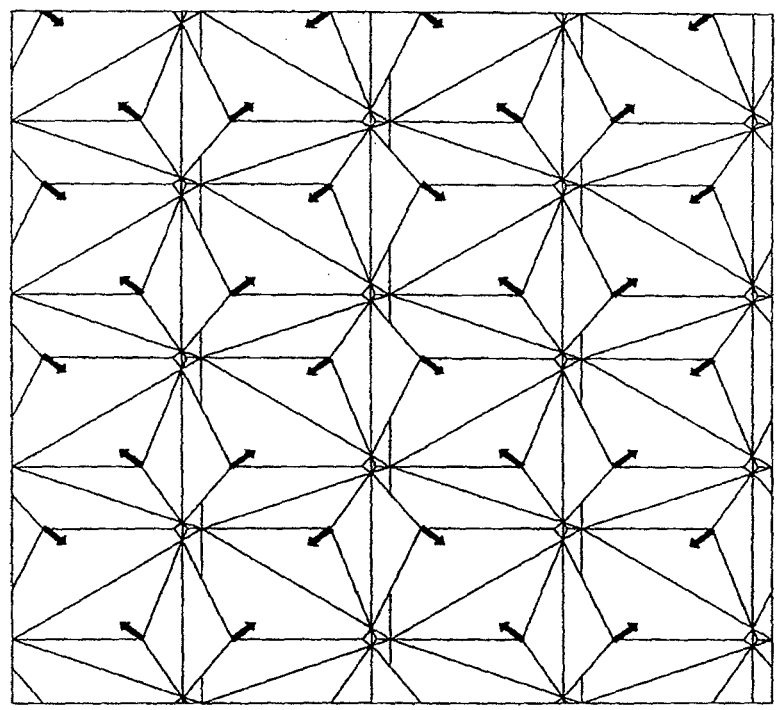
FIG. 32 shows a retroreflective element group of the invention.

FIG. 32 shows a set of retroreflective element pairs of the invention of FIGS. 30 and 31. As shown in FIG. 32, four optical axes are disposed in directions different from one another, and the azimuths of the optical axes are line-symmetrical to each other.

Figure 33:
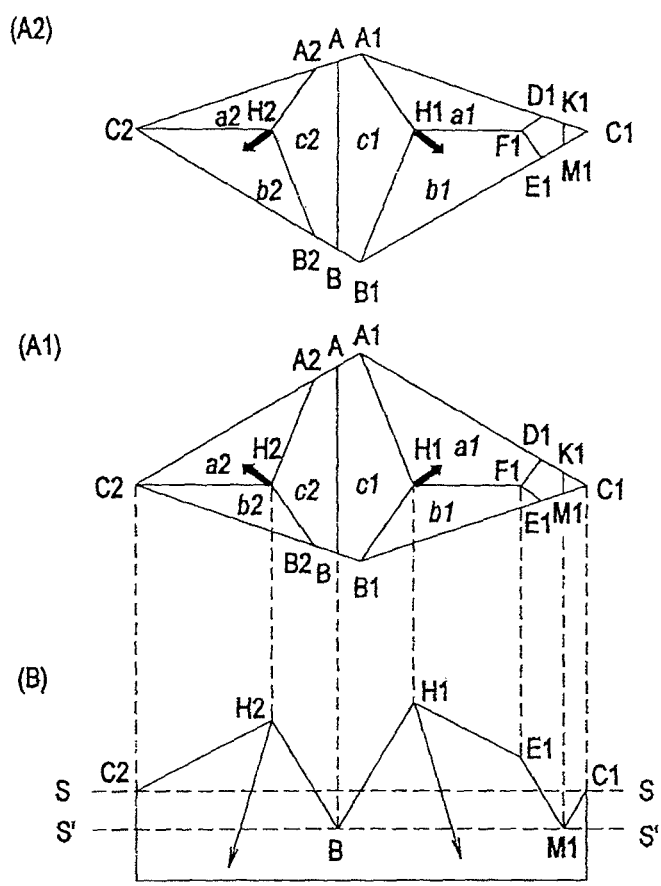
FIG. 33 shows a retroreflective element pair of the invention.

FIG. 33 shows a retroreflective element pair of the invention. FIG. 33 shows an element of the invention having a positively inclined optical axis. FIG. 33 shows the element pair in which the line segment (A and B) of FIG. 30 is formed at the Sc plane deeper than the S plane, the areas of the reflective side faces c1 and c2 is enlarged, and the ratio of the areas of the three reflective side faces (a1, b1, and c1) is closer to 1 comparing to the ratio of the areas of the three reflective side faces (a1, b1, and c1) of FIG. 29. Therefore, the retroreflective efficiency and the entrance angularity are improved.

When the optical axis of the retroreflective element is positively inclined as shown in FIG. 33, the areas of the a1, b1, and c1 planes can be brought close to one another by setting hx larger than hy. It is preferable to set hx/hy ranging from 1.05 to 1.5, more preferably hx/hy ranging from 1.07 to 1.4 so as to improve the retroreflective efficiency and the entrance angularity.

Figure 34:
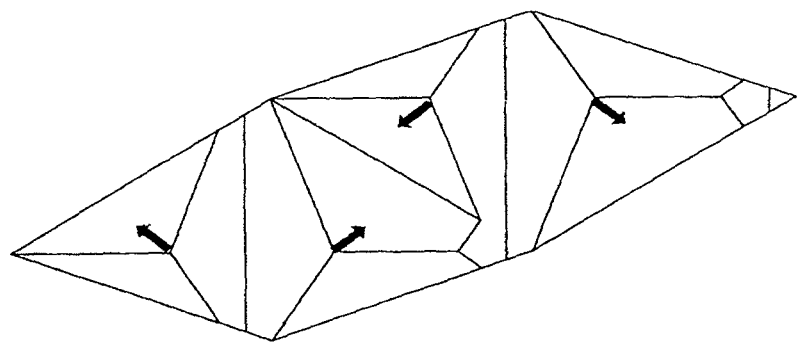
FIG. 34 shows a retroreflective element group of the invention.

FIG. 34 shows the state in which two element pairs of the invention of FIG. 33 are disposed to share the base line. As shown in FIG. 33, four optical axes are disposed in directions different from one another, and the azimuths of the optical axes are line-symmetrical to each other.

Figure 35:
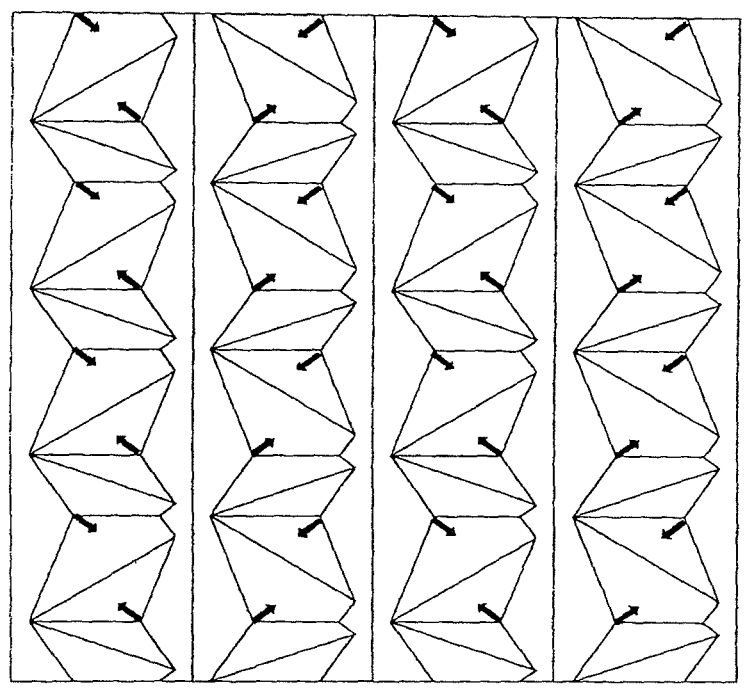
FIG. 35 shows a retroreflective element group of the invention.

FIG. 35 shows a set of retroreflective element pairs of the invention of FIGS. 33 and 34. As shown in FIG. 35, the four optical axes are disposed in directions different from one another, and the azimuths of the optical axes are line-symmetrical to each other.

Figure 36:
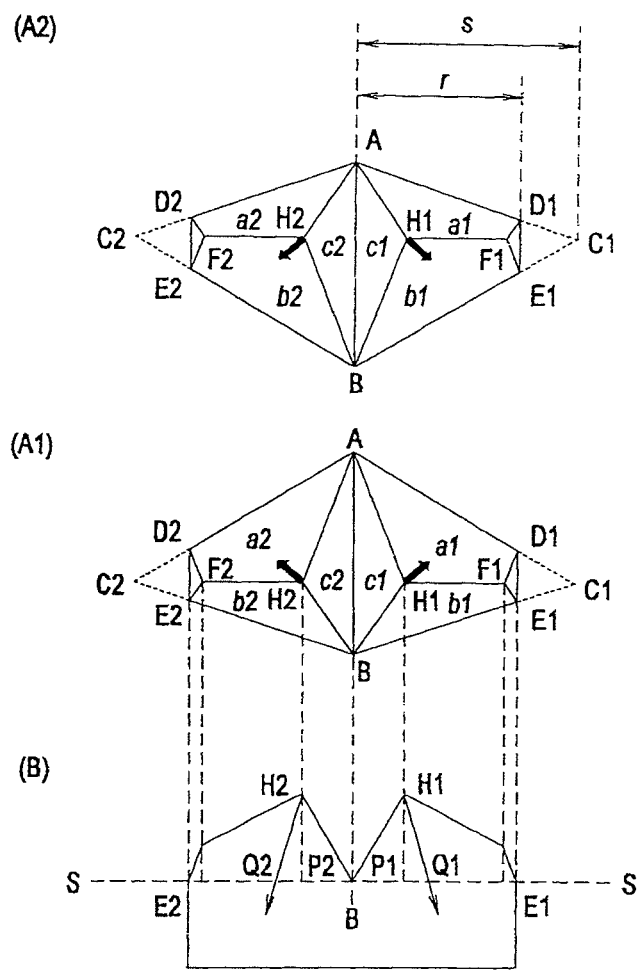
FIG. 36 shows a retroreflective element pair of the invention.

FIG. 36 shows the retroreflective article of the invention in which a projection shape of the base plane forming the retroreflective element is in trapezoids (A-B-E1-D1 and A-B-E2-D2).

The retroreflective element shown in FIG. 36 is formed by cutting out the apexes (C1 and C2) of one base plane of the conventional triangular pyramidal cube corner retroreflective element shown in FIG. 4 using the V-shape groove. The apexes (C1 and C2) of the base plane are located at the intersection of the extended lines of the two base lines (A-D1 and B-E1; and A-E2 and B-D2) constituting the base plane of isosceles trapezoid of the invention.

A ratio (R) of a distance r and a distance s expressed as follows:

$$R = r/s \qquad \text{(expression 2)}$$

preferably ranges from 0.4 to 0.95,
where r is a distance between two trapezoidal base lines (A-B and E1-D1; or A-B and E2-D2) forming an isosceles trapezoidal base plane of the retroreflective element of FIG. 36, and s is a distance between the intersections (C1 and C2) of the extended lines of other oblique lines (A-D1 and B-E1 and A-E2 and B-D2) and the baseline (A-B). It is preferable to set the ratio (R) of the distance r and the distance s in a range from 0.4 to 0.95, more preferably in a range from 0.5 to 0.9, because the difference in area among the three reflective side faces (a1 plane, b1 plane, and c1 plane; and a2 plane, b2 plane, and c2 plane) can be decreased and thus, the retroreflective efficiency and the entrance angularity can be improved.

Figure 37:
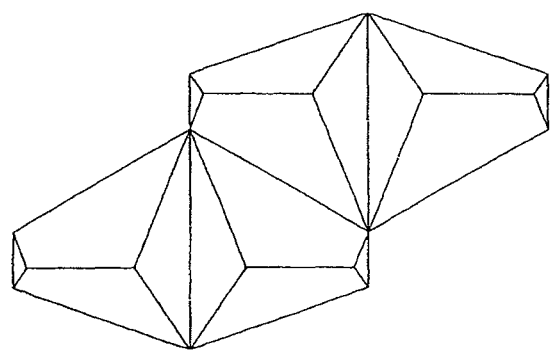
FIG. 37 shows a retroreflective element group of the invention.

FIG. 37 shows the state in which the two element pairs of the invention of FIG. 35 are disposed to share the base line.

Figure 38:
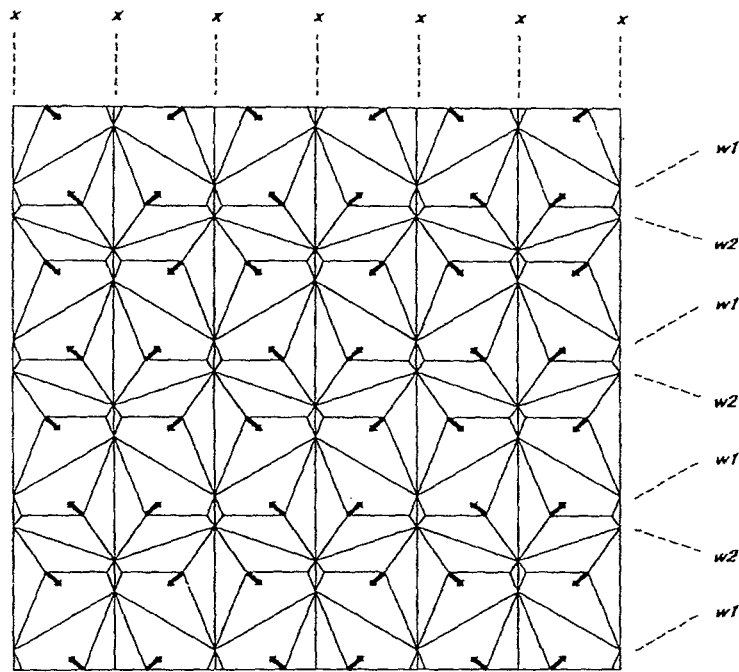
FIG. 38 shows a retroreflective element group of the invention.

FIG. 38 shows a set of retroreflective element pairs of the invention of FIGS. 36 and 37. As shown in FIG. 38, the four optical axes are disposed in directions different from one another, and the azimuths of the optical axes are line-symmetrical to each other.

Figure 39:
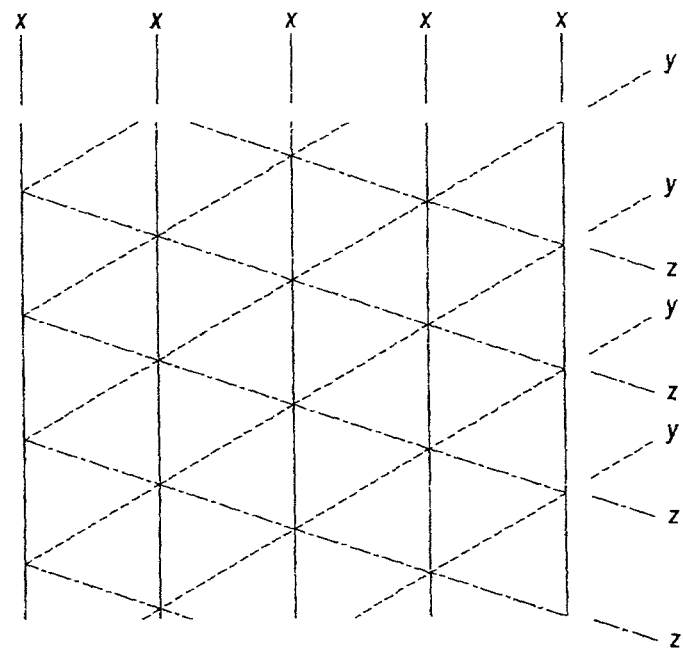
FIG. 39 shows a trajectory of a base portion of a V-groove group in order to obtain the element group of FIG. 2.

FIG. 39 shows the trajectory of the base portion of the groove group having V-shape cross section forming the known conventional inequilateral element pair group of FIG. 2. The groove group includes parallel groove groups (x, y, and z) in three directions, and the parallel groove groups (x, y, and z) are linear line groups intersecting one another at one point.

FIG. 4 shows the retroreflective element pair of the invention. The element pair of the invention is formed by the first element pair (A1) and the second element pair (A2), which is line-symmetrical thereto. All the element pairs are formed by inequilateral elements whose base planes have inequilateral triangular shapes. The element pair is line-symmetrical in relation to a shared base line (A-B). All the base lines (A-B, B-C, and C-A) are located in the common plane (S plane).

FIG. 6 shows the set of retroreflective element pairs of the invention of FIG. 4. As shown in FIG. 6, the four optical axes are disposed in directions different from one another, and the azimuths of the optical axes are line-symmetrical to each other.

Figure 40:
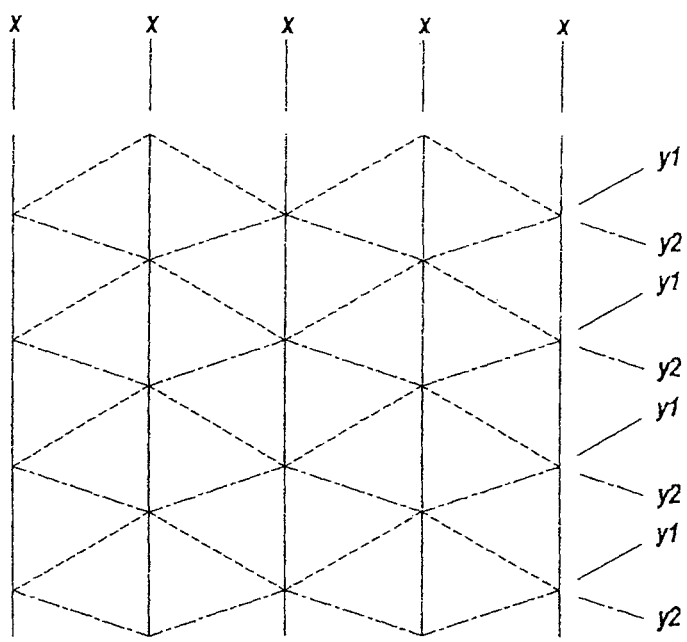
FIG. 40 shows a trajectory of a base portion of a V-groove group in order to obtain the element group of FIG. 6.

FIG. 40 shows the trajectory of the base portions of the groove group having V-shape cross section forming the inequilateral element pair group of the invention of FIG. 6. The groove groups include the parallel groove group (x) in one of the directions and the parallel groove groups (y1 and y2) having substantially V-shape cross section of line-symmetrical shapes and the trajectories of the base portions of the groove groups form a polygonal line Referring to FIG. 40, the parallel groove groups (y1 and y2) having substantially V-shape cross section and the trajectories of the base portions exhibiting the polygonal line are inflective at the positions where the parallel groove groups (y1 and y2) intersect with the parallel groove group (x) having substantially symmetrical V-shape cross section and the trajectory of the base portion exhibiting the straight line.

Figure 41:
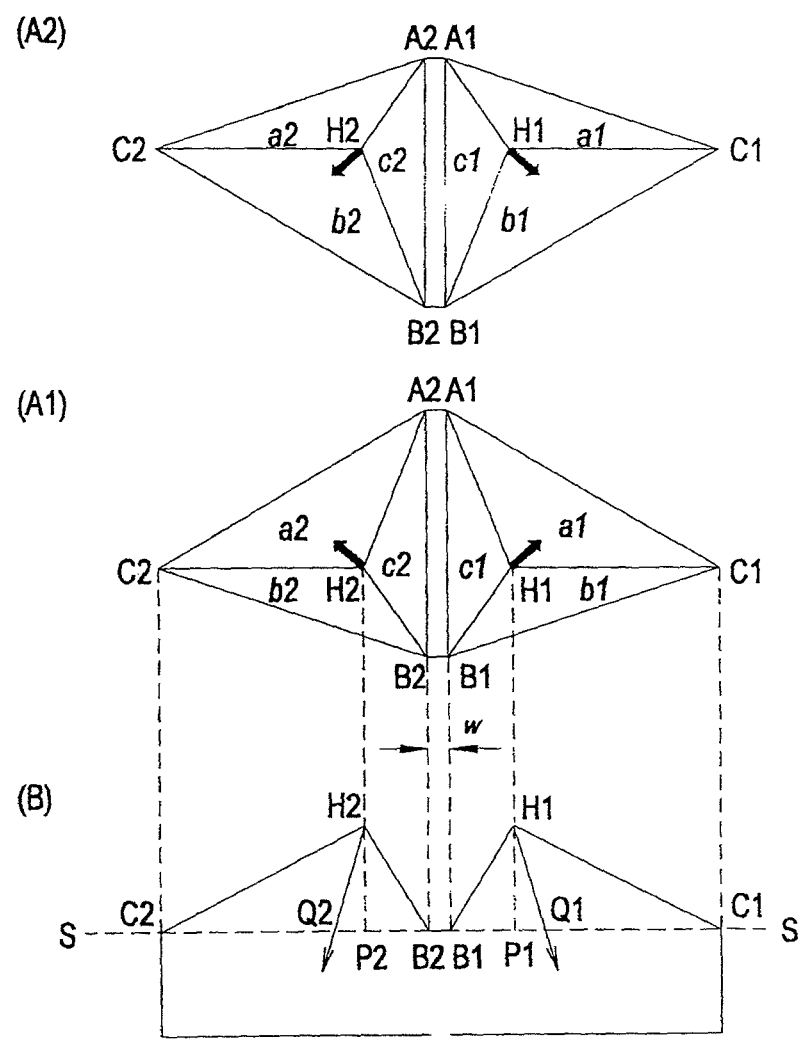
FIG. 41 shows a multidirectional element pair of the invention.

FIG. 41 shows a retroreflective element pair of the invention. The element pair of the invention is formed by the first element pair (A1) and the second element pair (A2), which is line-symmetrical thereto. All the element pairs are formed by inequilateral elements whose base planes have inequilateral triangular shapes. The element pair is formed in line-symmetrical in relation to a shared base line (A-B). All the base lines (A-B, B-C, and C-A) are located in the common plane (S plane). A groove width (w) of linear parallel groove group (x) is a groove width of the base portions of the polygonal line parallel groove groups (y1 and y2).

Figure 42:
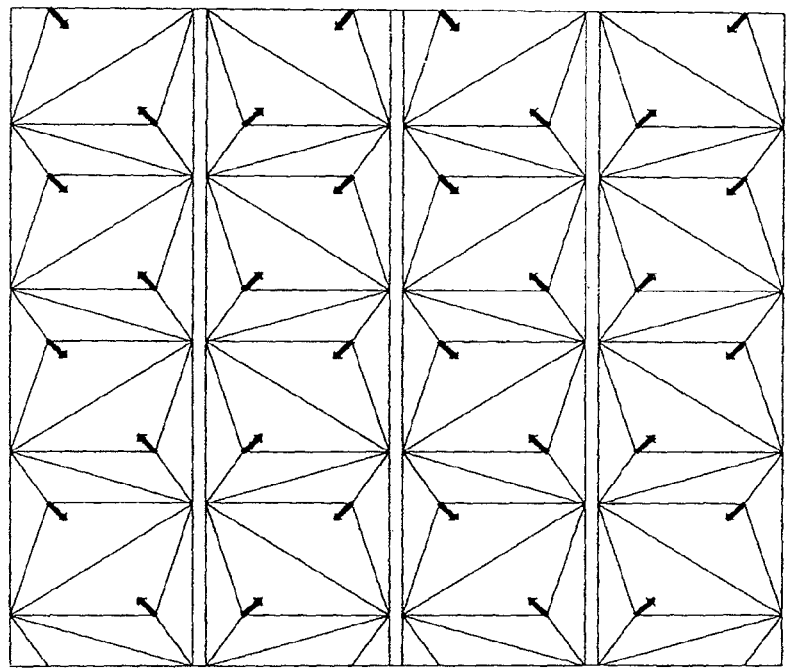
FIG. 42 shows a multidirectional element group of the invention.

FIG. 42 shows a set of retroreflective element pairs of the invention of FIG. 41. As shown in FIG. 42, four optical axes are disposed in directions different from one another, and the azimuths of the optical axes are line-symmetrical to each other.

Figure 43:
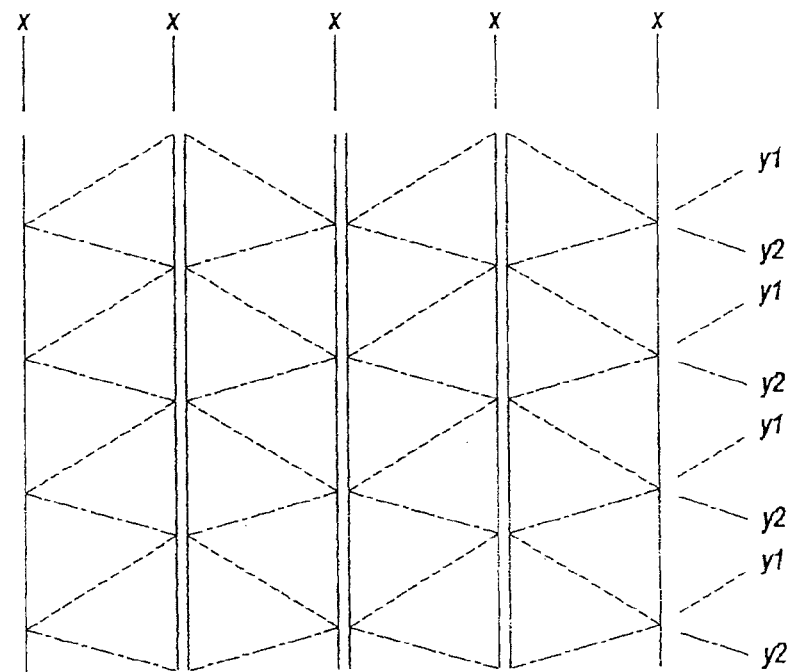
FIG. 43 shows a trajectory of a base portion of a V-groove group in order to obtain the element group of FIG. 42.

FIG. 43 shows the trajectory of the base portions of the groove group having V-shape cross section forming the inequilateral element pair group of the invention of FIG. 42. The groove groups include the linear parallel groove group (x) in one direction and the polygonal line parallel groove groups (y1 and y2) in two directions, and the polygonal line parallel groove groups (y1 and y2) are repeatedly formed with the groove width (w) of the base portion.

In the invention, the groove width (w) of the base portion preferably ranges from 5 to 100 μm, more preferably from 15 to 50 μm. The groove width (w) smaller than 5 μm makes the working tool hardly turned and the groove width (w) larger than 100 μm makes the retroreflective efficiency deteriorated and thus undesirable.

An interval can be adjusted by the shape of the working tool. Specifically, an interval is formed by providing a flat portion at a tip of the V-shape working tool, and transferring the shape of the flat portion to the retroreflective article. The interval can be adjusted by the width of the flat portion.

Preferably ruling method or a shapering method, in which a workpiece is cut out while a diamond tool having V-shape tip is pressed against the workpiece, is adopted in a working machine used to form the triangular pyramidal cube corner retroreflective element pair group forming the retroreflective article of the invention.

Figure 44:
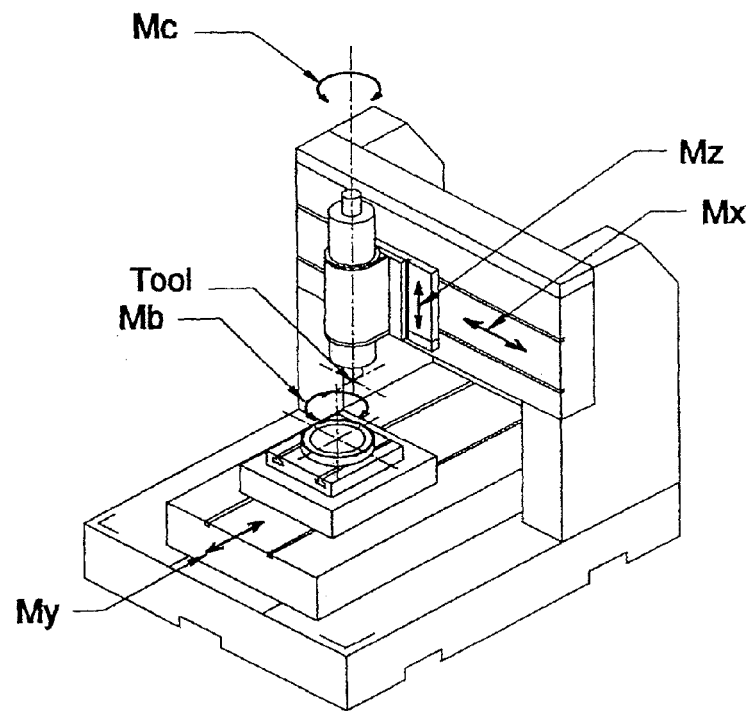
FIG. 44 shows a working machine used to form a retroreflective element of the invention.

In a shapering machine used to form the triangular pyramidal cube corner retroreflective element pair group of the invention, the working tool and the workpiece are placed as shown in FIG. 44, and the workpiece is processed by the five-direction control (Mx axis, My axis, Mz axis, Mb axis, and Mc axis).

The workpiece is fixed onto a turn table, and the working tool is moved along the Mx axis or My axis to form the V-shape groove. At this point, the depth of the V-shape groove can be changed by controlling the position in the Mz axis.

The projection shape of the working tool having the V-shape tip is changed by slightly rotating the Mc axis in order to form the V-shape groove of the invention, so that the angle of the V-shape groove can be continuously changed in one V-shape groove.

In the shapering, in order to form the V-shape groove having the desired depth, several times of groove forming, with a working depth for a groove forming ranging from 1 to 10 μm are required so as to obtain a predetermined depth. The working tool and the workpiece are moved along the Mx axis and the My axis during the shapering, whereby the V-shape groove can be formed in not only the straight line but any trajectory are drawn. Therefore, the retroreflective element having the non-linear base portion can be formed. In such non-linear base portion of the retroreflective element pair of the invention, the trajectory of the base portion of the V-shape groove in one of the directions does not draw the straight line.

Diamond, sapphire, and various cutting alloys can be used as the working tool to form the retroreflective element of the invention. Among others, the diamond is excellent in high abrasive resistance, and is preferable in order to keep the angle of the V-shape groove constant during the working process. Alternatively, in order not to change the angle of the V-shape groove due to the abrasion, a preliminary cutting to a predetermined depth and finishing cutting to a target depth may be may be separately performed using two working tools.

With the conventionally known fry cutting, the V-shape groove can also be formed. The projection shape of the diamond tool is changed by changing the diamond tool set-up angle, and whereby the angle of the V-shape groove can be finely changed. In the fry cutting, advantageously the V-shape groove having the desired depth can be formed with one cut. However, although the fry cutting is suitable to dra a linear trajectory, the fry cutting is not suitable to accurately draw a non-linear trajectory. Furthermore, in the fry cutting, the diamond tool set-up angle cannot be changed during the working process in order to change the angle of the V-shape groove.

Figure 45:
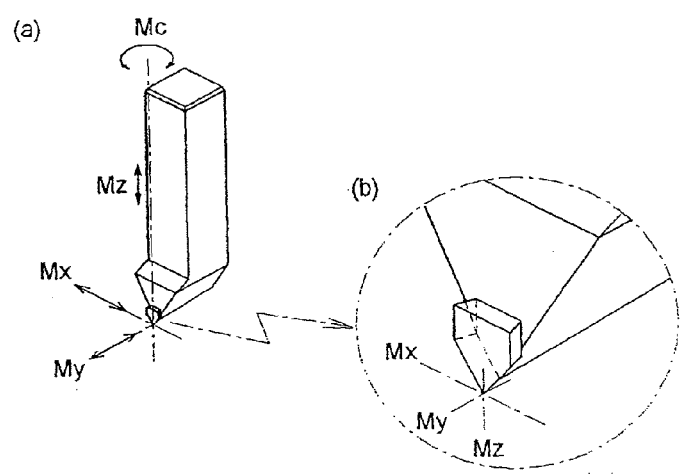
FIG. 45 shows a working tool used to form a retroreflective element of the invention.

FIG. 45A shows an example of the diamond tool used to form the triangular pyramidal cube corner retroreflective element of the invention. As shown in the enlarged view of FIG. 45B, the diamond having the V-shape tip is attached to the leading end of the working tool, the projection shape of the diamond is reflected on the shape and angle of the V-shape groove. FIGS. 46A to 46D illustrate that angle of the V-shape groove can be changed by variously changing the diamond tool set-up angle and how the V-shape groove to be formed can be changed.

Figure 46:
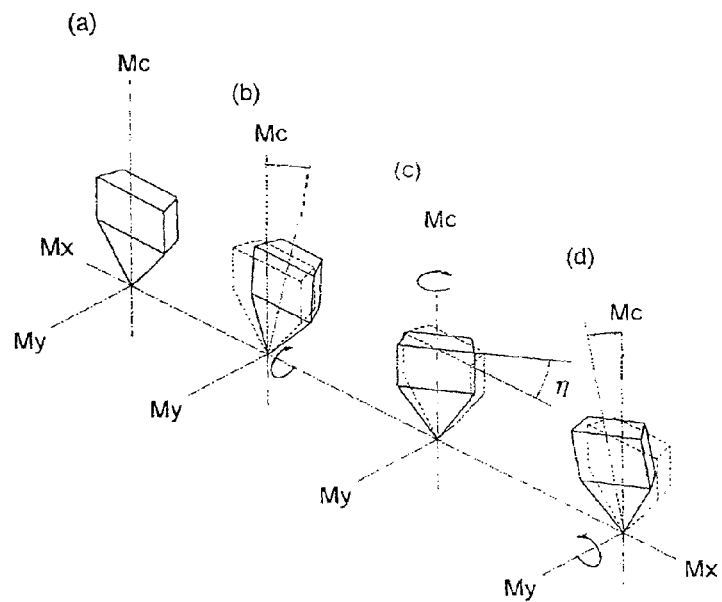
FIG. 46 shows a method for attaching a working tool used to form a retroreflective element of the invention.

Referring to FIG. 46A, the symmetrical V-shape diamond is attached perpendicular to the working reference surface in symmetrical position by the usual set-up method. The working tool can be rotated in the three directions by the above-mentioned three-direction working axes.

FIG. 46B shows the slightly inclined working tool by rotating along the Mx axis around the tip of the working tool. With such working tool, the angle of the V-shape groove can be narrowed. Usually such change is achieved by changing the working tool set-up angle in the vertical direction (Mc axis).

FIG. 46C shows a slightly turned working tool by rotating (angle; η) along the Mc axis around the tip of the working tool to change the projection shape. With such working tool, the angle of the V-shape groove can slightly be narrowed. Such change can be performed by turning the Mc axis during the working process of the V-shape groove, and thus formed cross sectional shape of the V-shape groove does not have a constant angle.

A relationship between the turning angle (η) of the cutting tool of FIG. 46C and the projection angle (corresponds to the sum of the single-sided groove angles on both sides and also referred to as two-sided groove angle (2G')) of the tip of the cutting tool can be expressed by an expression 3:

$$2G'=2\tan^{-1}(\tan G \cdot \cos \eta)$$ (expression 3), where G is a single-sided groove angle at the tip of the working tool without any turn, η is a turning angle of the working tool of FIG. 46C, and G' is a projection single-sided groove angle of the working tool.

In the invention, preferably the working tool is turned on the groove width (w) of the base portion.

Figure 47:
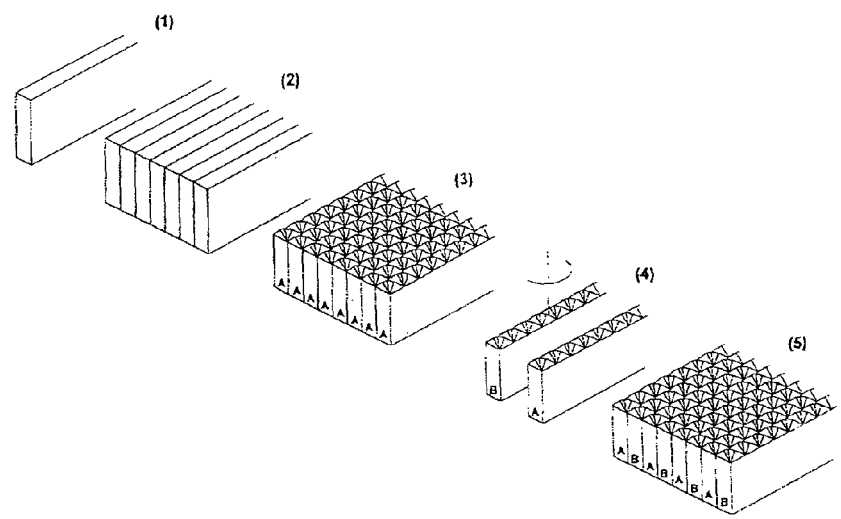
FIG. 47 shows a method for forming a triangular pyramidal cube corner retroreflective element of the invention.

FIG. 47 is a view illustrating a method for forming the triangular pyramidal cube corner retroreflective element of the invention.

FIG. 47(1) shows one-array thin plate, and FIG. 47(2) shows many of the thin plates, which are laminated. FIG. 47(3) shows many laminated thin plates with V-grooves formed. The V-grooves can be directly formed on the many laminated thin plates. However, in the invention, preferably a metal plating layer whose thickness is larger than the height of the triangular pyramidal cube corner element is deposited on the end-face integrated plane after many thin plates are laminated, and the parallel V-groove groups are formed from three directions on the metal plating layer. At this point, all the element pair arrays are of A group.

FIG. 47(4) illustrate that the thin plate PB can be formed by the left-right rotation of the thin plate PA having the group of element pair arrays A formed on the end face.

FIG. 47(5) shows alternately laminated thin plates PA and the thin plates PB by repeating the process illustrated by the FIG. 47(4).

Figure 48:
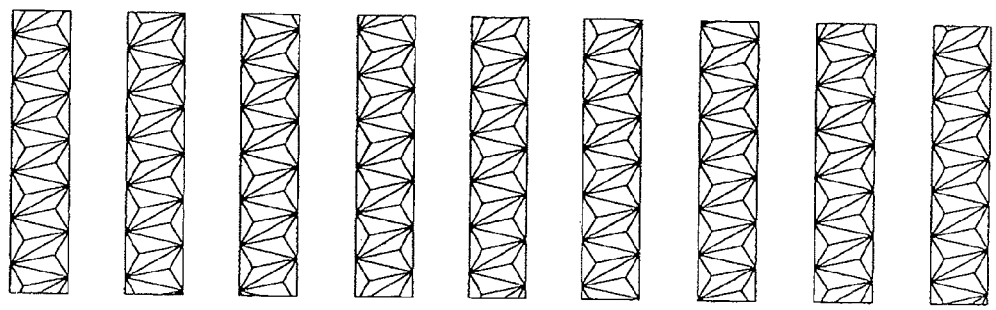
FIG. 48 shows a thin plate used in the invention.

FIG. 48 shows thin plates obtained by laminating only the thin plates PA.

Figure 49:
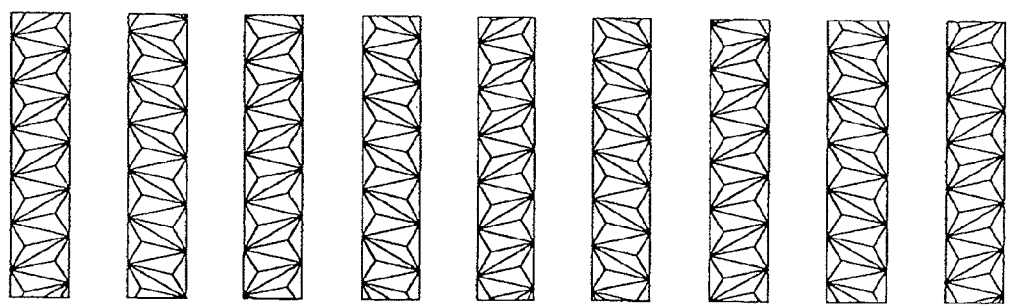
FIG. 49 shows a thin plate used in the invention.
Figure 50:
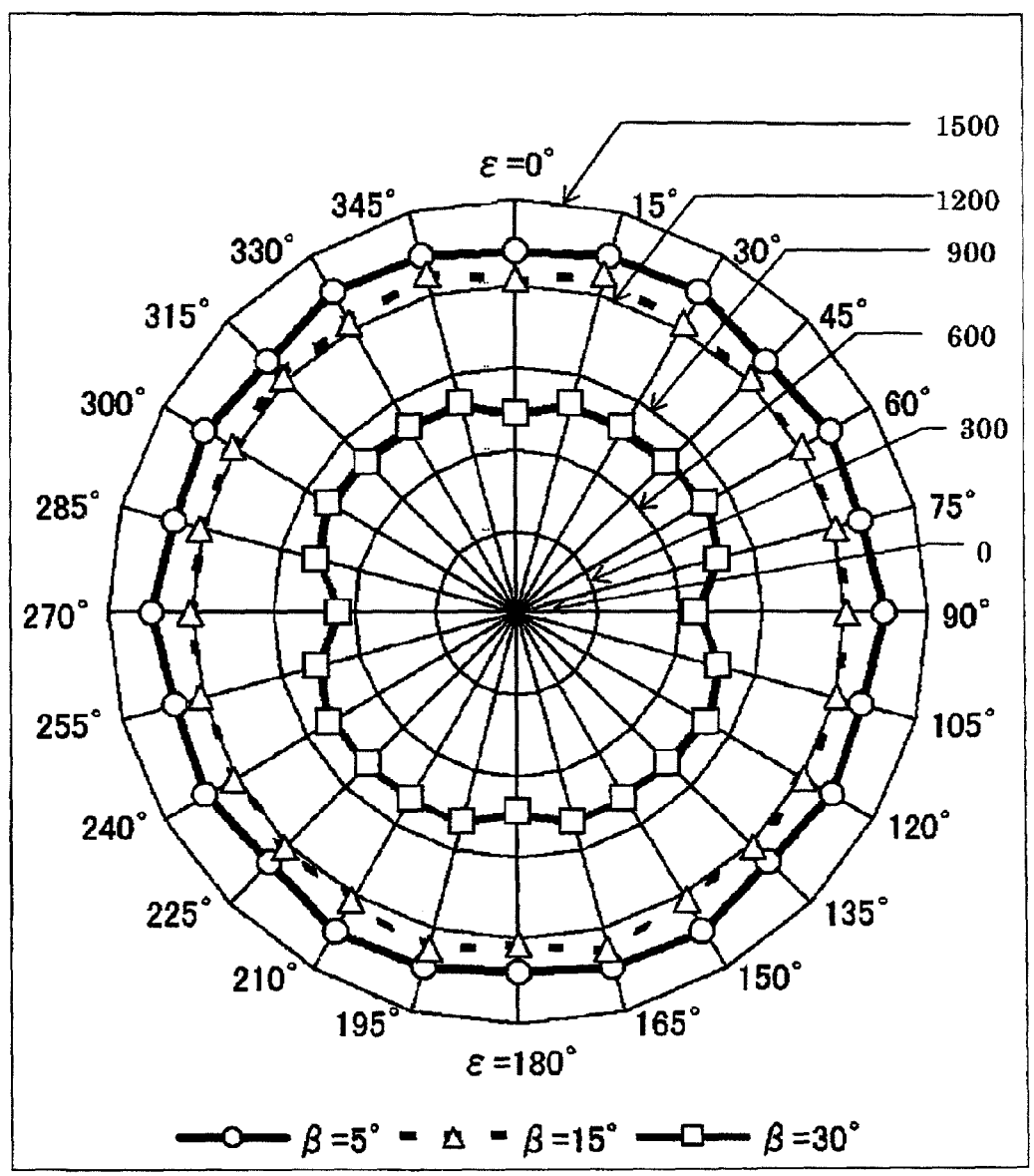
FIG. 50 shows graph 1 of Example 1.
Figure 51:
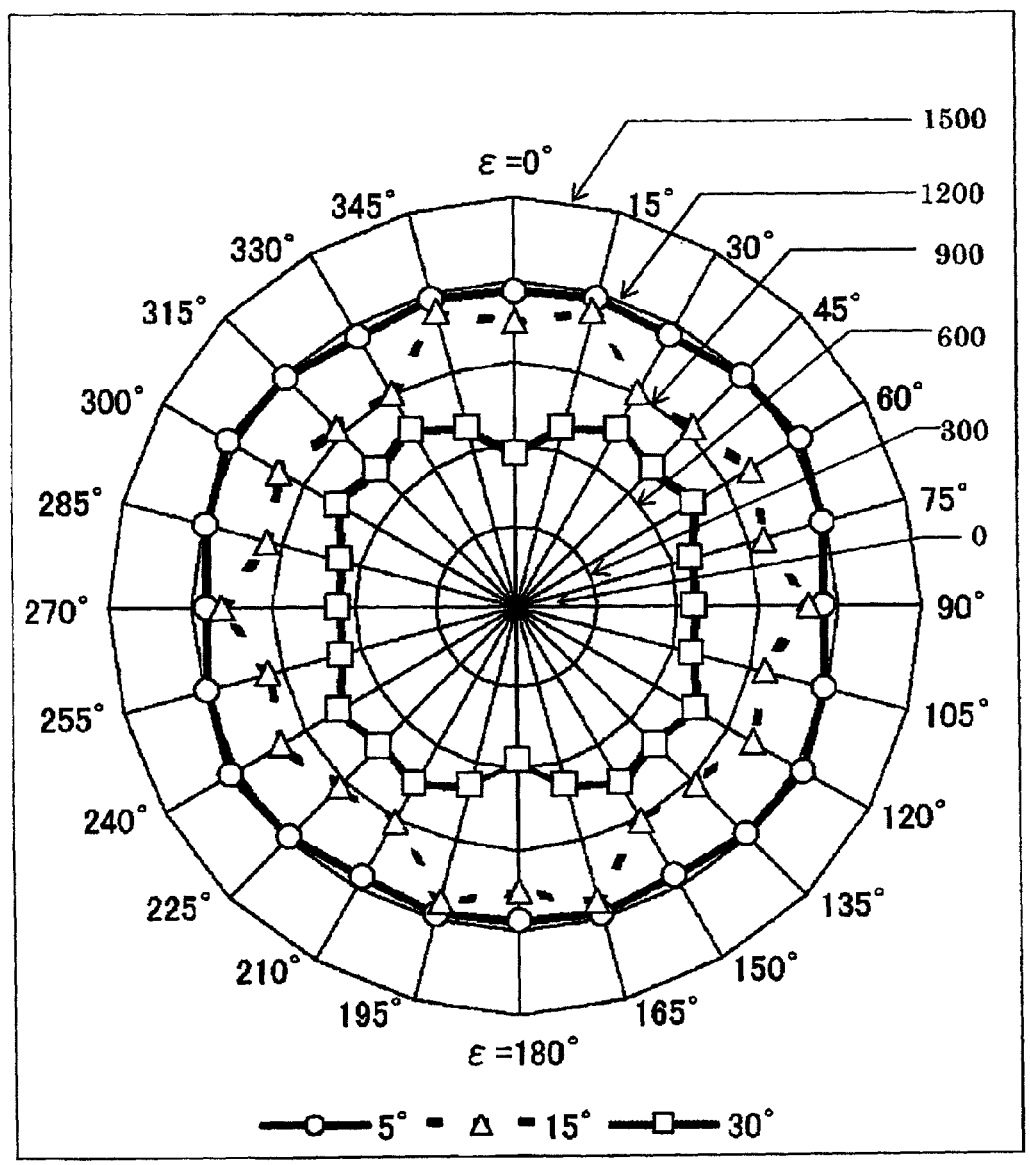
FIG. 51 shows graph 2 of Example 2.
Figure 52:
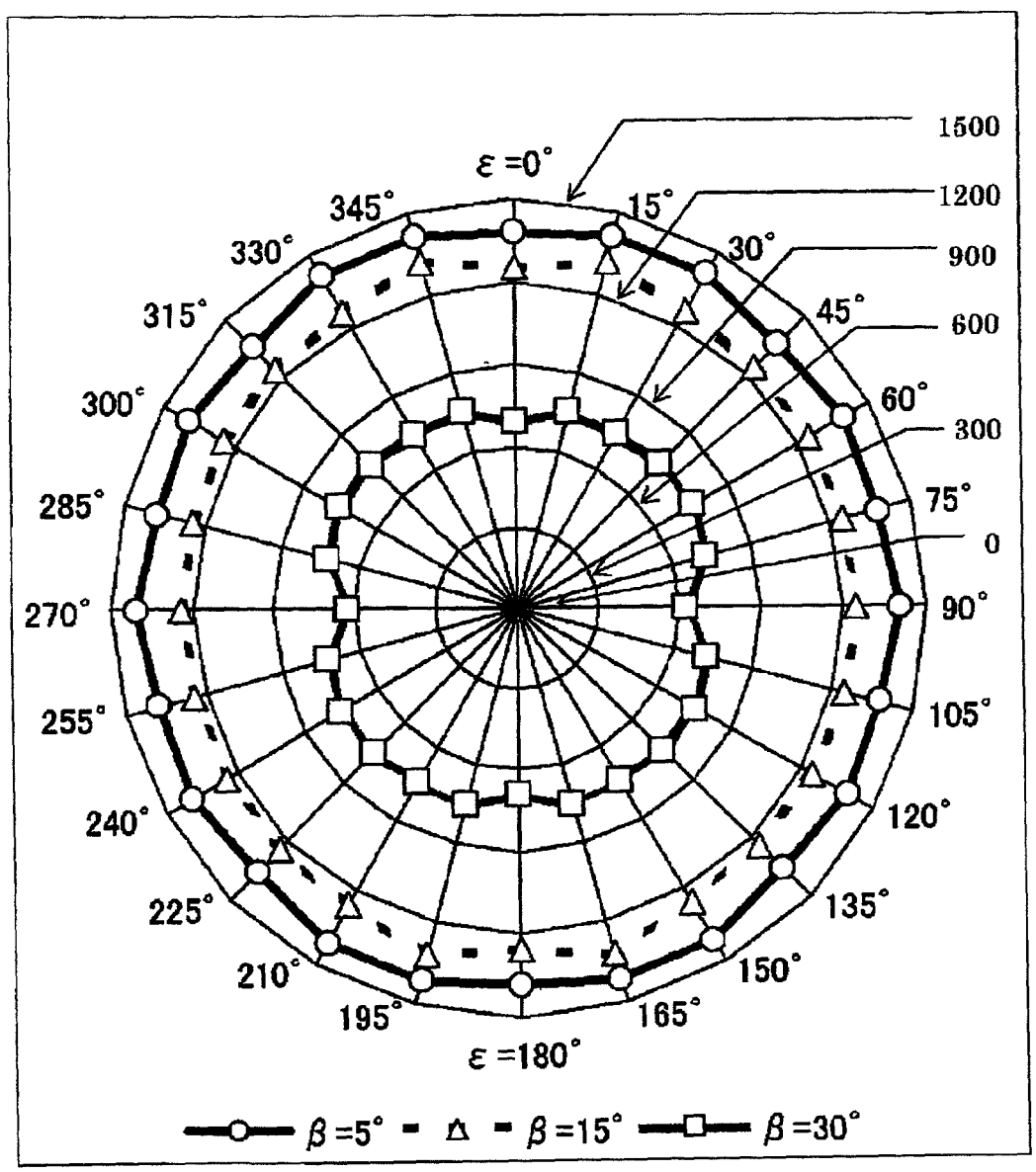
FIG. 52 shows graph 3 of Example 3.
Figure 53:
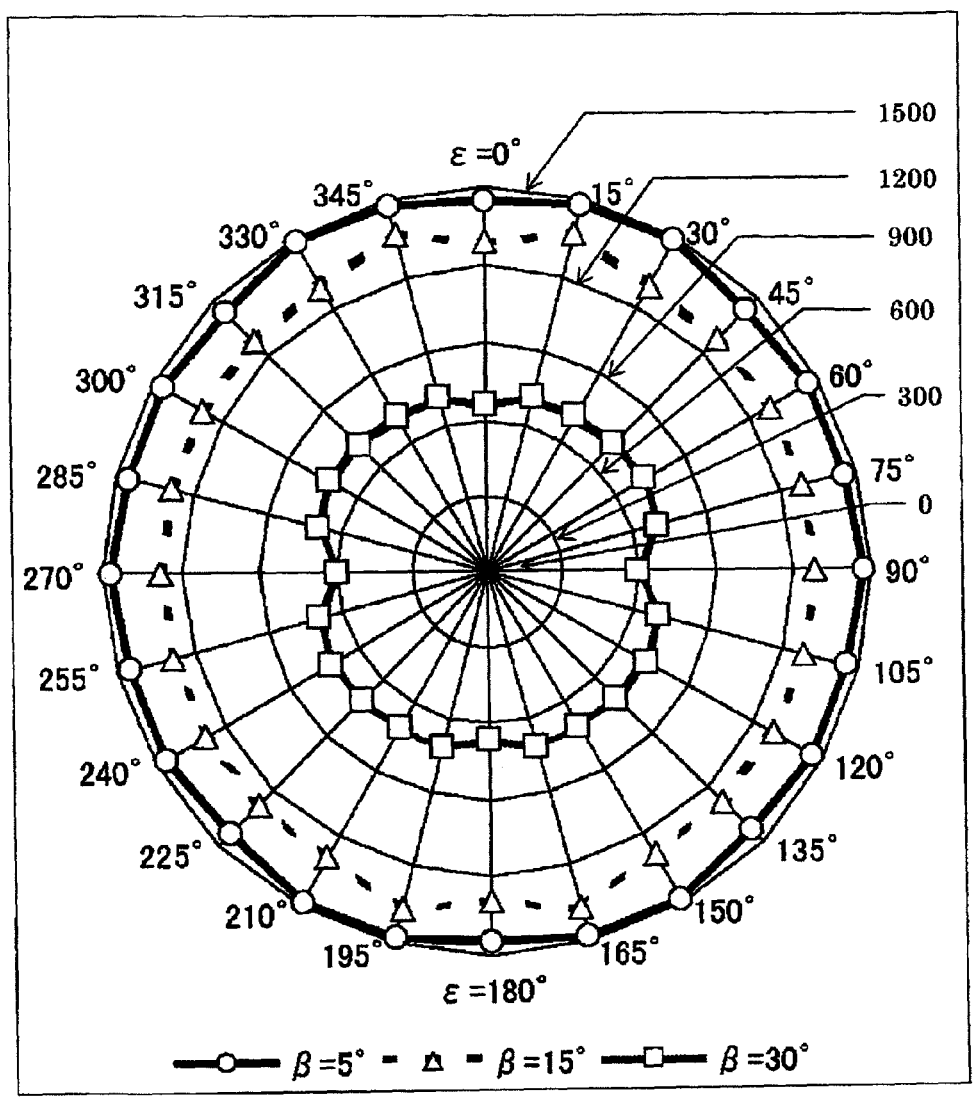
FIG. 53 shows graph 4 of Example 4.
Figure 54:
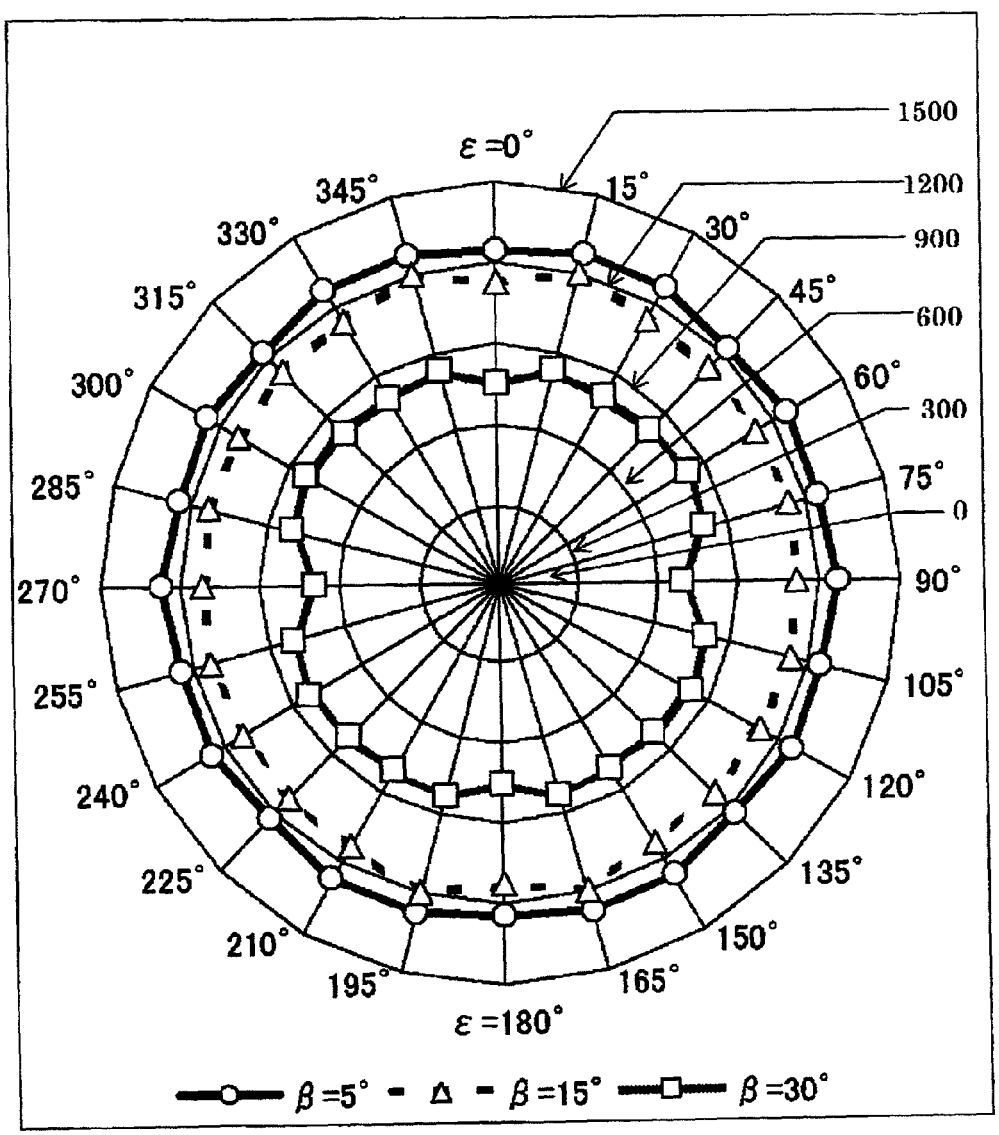
FIG. 54 shows graph 5 of Example 5.
Figure 55:
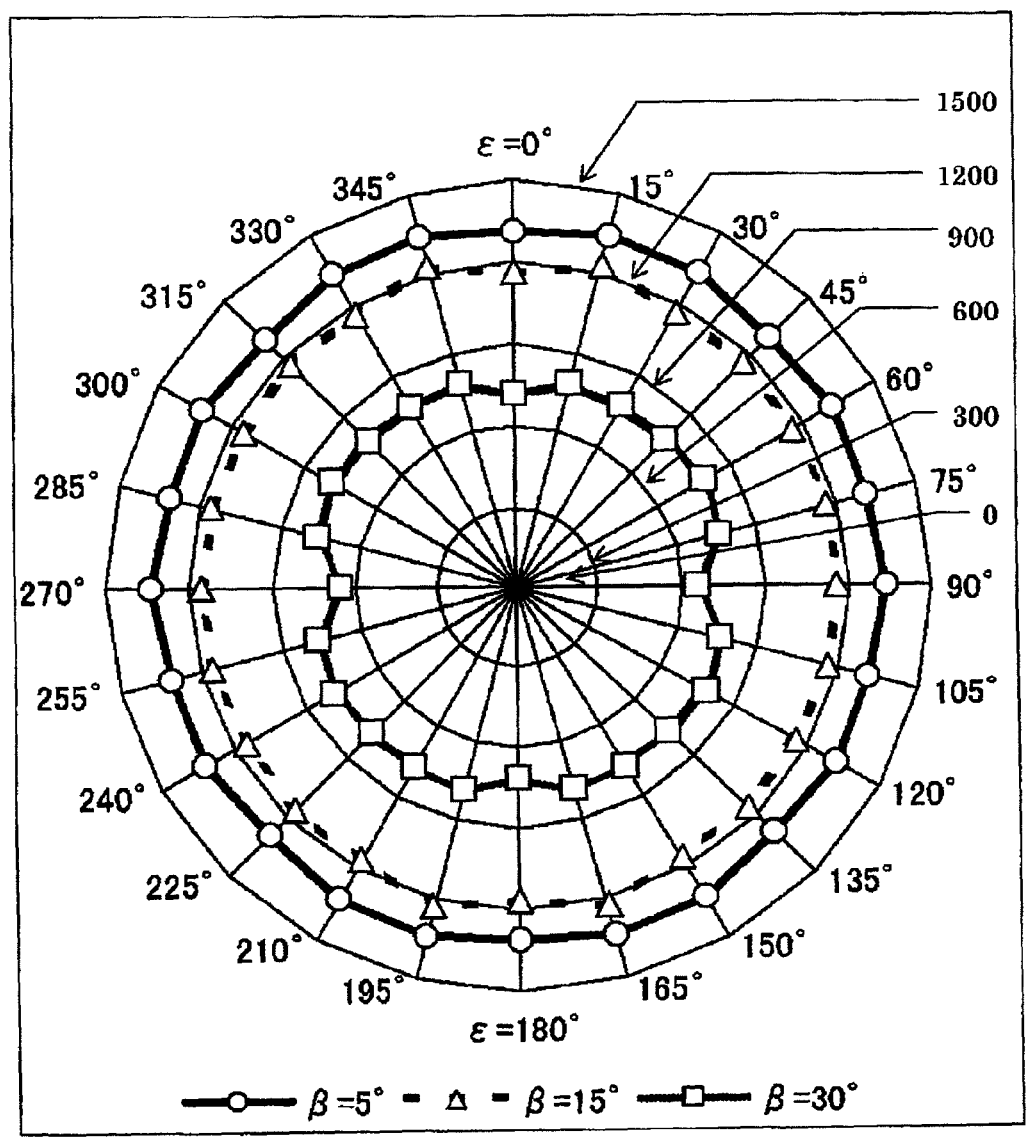
FIG. 55 shows graph 6 of Example 6.
Figure 56:
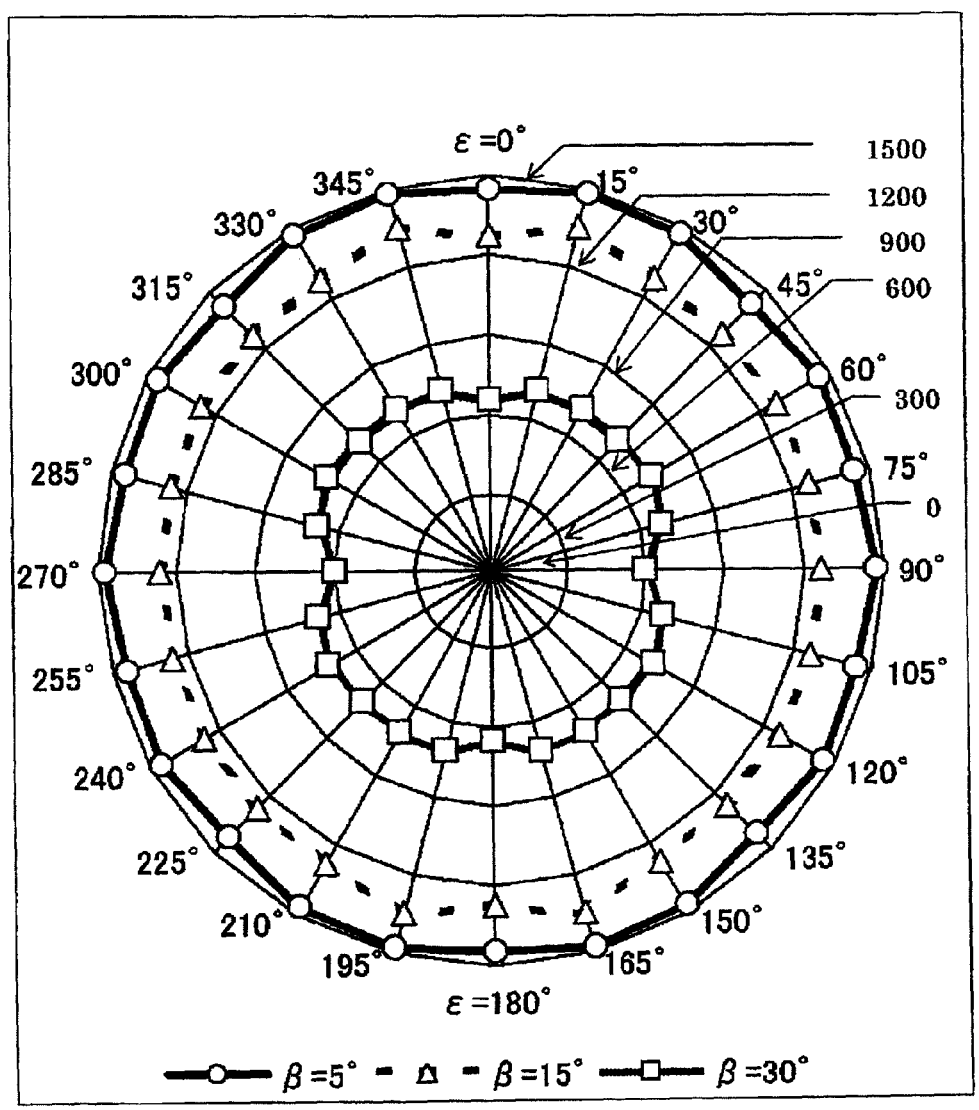
FIG. 56 shows graph 7 of Example 7.
Figure 57:
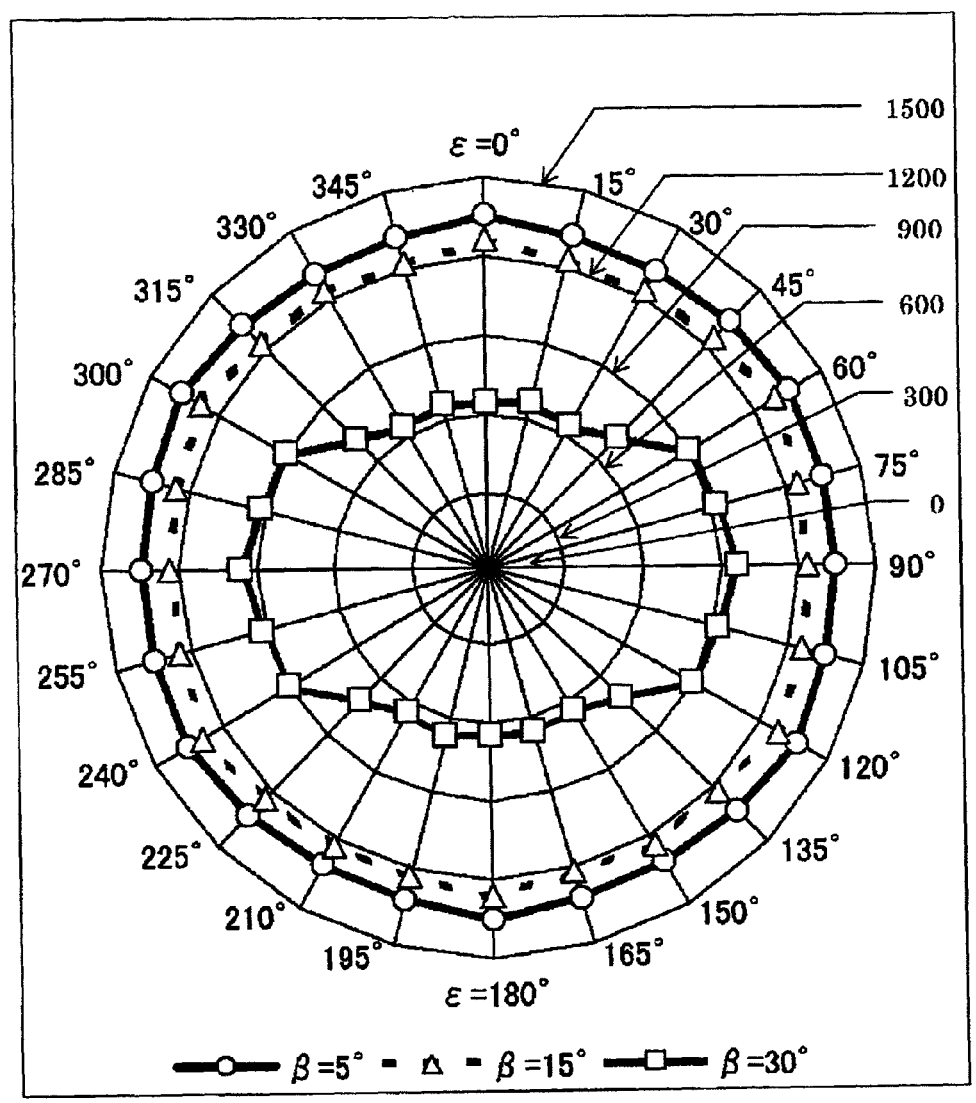
FIG. 57 shows graph 8 of Comparative Example 1.
Figure 58:
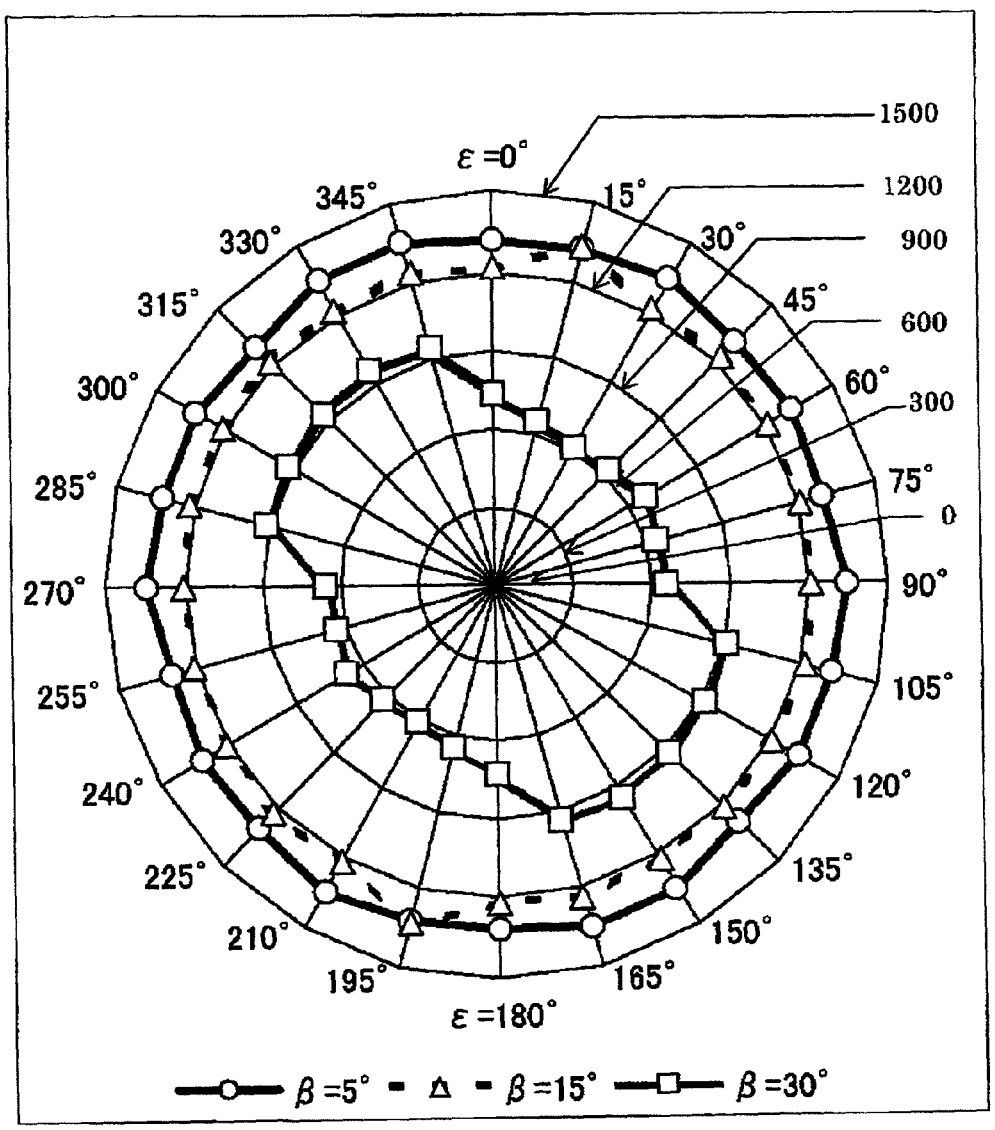
FIG. 58 shows graph 9 of Comparative Example 2.

FIG. 49 shows the thin plates aligned as the thin plate PA, the thin plate PB, the thin plate PA, the thin plate PB, by alternatively rotating the thin plate PA in left-right direction.

FIG. 7 shows the thin plates aligned as the thin plate PA, the thin plate PA, the thin plate PB, the thin plate PB, the thin plate PA, the thin plate PA, . . . by rotating every adjacent two thin plates PA in left-right direction.

EXAMPLES

The invention will be more specifically described in detail with reference to Examples.

The retroreflective performance in the description including Example is calculated by a three-dimensional optical simulation. In the optical simulation, a behavior of the light in a three-dimensional space is calculated by Monte Carlo ray tracing method. White parallel light is used as a light source, and the computation is performed with the size of the retroreflective article set to 100 mm². The computation is performed at entrance angles (β) of 5°, 15°, and 30° and at every 15° of rotation angle (ε) ranging from 0° to 345°. The rotation angularity evaluation is quantified by the total value of an illuminance distribution of the surface for the evaluation, which is set at 10 m away from the retroreflective article, and the rotation angularity is evaluated with the following criteria:

◎: variation coefficient of each rotation angle at β=30° is equal to or larger than 20;

○: variation coefficient of each rotation angle at β=30° is equal to or larger than 10 and smaller than 10;

×: variation coefficient of each rotation angle at β=30° is smaller than 10.

A numerical value (TV), which is the sum of the total values of the illuminance distributions of the surfaces for the evaluation at the entrance angle of 5° and at each of the rotation angles, is calculated and the comparison is made between Examples and Comparative Examples.

Example 1

The triangular pyramidal cube corner retroreflective element pair group in a shape as shown in FIGS. 4 to 6 with the settings of: ∠C1AB of FIG. 4A2 to 66.659°; ∠C1BA to 54.918°; the element height to 81.066 μm; the optical axis inclination angle θ to 6°; and θa to 70° is drawn by 3D-CAD. Then, the optical simulation is performed using the drawing.

Example 2

The triangular pyramidal cube corner retroreflective element pair group in a shape as shown in FIGS. 4 to 6 with the settings of: ∠C1AB of FIG. 4A2 to 69.586°; ∠C1BA to 52.033°; the element height to 78.776 μm; the optical axis inclination angle θ to set at 9°; and θa to 70° is drawn by 3D-CAD. Then, the optical simulation is performed using the drawing.

Example 3

The triangular pyramidal cube corner retroreflective element pair group in a shape as shown in FIGS. 13 to 15 with settings of: ∠C1AB of FIG. 13A2 set to 66.659°; ∠C1BA set to 54.918°; the optical axis inclination angle θ to 6°; θa set to 70°; ha set to 81.066 μm; hb set to 81.066 μm; and hc set to 91.066 μm is drawn by 3D-CAD. Then, the optical simulation is performed using the drawing. In this case, hmax/hmin is 1.123.

Example 4

The triangular pyramidal cube corner retroreflective element pair group in a shape as shown in FIGS. 19 to 21 with settings of: ∠C1AB of FIG. 19A2 to 66.659°; ∠C1BA to 54.918°; the optical axis inclination angle θ to 6°; θa to 70°; ha to 96.066 μm; hb to 81.066 μm; and hc to 91.066 μm is drawn by 3D-CAD. Then, the optical simulation is performed using the drawing. In this case, hmax/hmin is 1.185.

Example 5

The triangular pyramidal cube corner retroreflective element pair group in a shape as shown in FIGS. 30 to 32 with settings of: ∠C1A1B1 of FIG. 30A2 to 66.659°; ∠C1B1A1 to 54.918°; the element height to 81.066 μm; the optical axis inclination angle θ to 6°; and θa to 70°, in which the V-shape groove in the AB direction is provided 10 μm toward C2 is drawn by 3D-CAD. Then, the optical simulation is performed using the drawing. In this case, the offset amount is 3% of the distance between the vertexes C1 and C2.

Example 6

The triangular pyramidal cube corner retroreflective element pair group in a shape as shown in FIGS. 33 to 35 with settings of: ∠C1A1B1 of FIG. 33A2 to 66.659°; ∠C1B1A1 to 54.918°; the element height to 81.066 μm; the optical axis inclination angle θ to 6°; and θa to 70°, in which the V-shape groove in the AB direction is provided 10 μm toward C2, the depth of the V-shape groove in the AB direction is set to 91.066 μm, and the depths of other V-shape grooves are set to 81.066 μm, is drawn by 3D-CAD. Then, the optical simulation is performed using the drawing of 3D-CAD. In this case, the offset amount is 3% of the distance between the vertexes C1 and C2, and hmax/hmin is 1.123.

Example 7

The triangular pyramidal cube corner retroreflective element pair group in a shape as shown in FIGS. 36 to 38 with settings of: ∠C1AB of FIG. 36A2 to 66.659°; ∠E1BA to 54.918°; the element height to 81.066 μm; the optical axis inclination angle θ to 6°; and θa to 70°, in which a pitch of the V-shape grooves is defined such that the ratio (R) becomes 0.7, is drawn by 3D-CAD. Then, the optical simulation is performed using the drawing.

Comparative Example 1

The triangular pyramidal cube corner retroreflective element pair group in a shape as shown in FIGS. 1 to 3 with settings of: both ∠C1AB and ∠C1BA to 56.594°; the element height to 100 μm; the optical axis inclination angle θ to 6°; and θa to 180° is drawn by 3D-CAD. Then, the optical simulation is performed using the drawing of 3D-CAD.

Comparative Example 2

The triangular pyramidal cube corner retroreflective element pair group in a shape as shown in FIGS. 1 to 3 with settings of: ∠C1AB to 66.659°; ∠C1BA to 54.918°; the element height to 81.066 μm; the optical axis inclination angle θa to 6°; and θa to 70° is drawn by 3D-CAD. Then, the optical simulation is performed using the drawing. FIGS. 50-58 show the optical simulation results of Examples 1-7 and Comparative Examples 1 and 2, respectively.

Table 1 shows the rotation angularity evaluation result and TV.

TABLE 1

|  | Rotation angularity evaluation | TV |
|---|---|---|
| Example 1 | ⊚ | 31726 |
| Example 2 | ○ | 28263 |
| Example 3 | ⊚ | 33452 |
| Example 4 | ⊚ | 35221 |
| Example 5 | ⊚ | 30225 |
| Example 6 | ⊚ | 31528 |
| Example 7 | ⊚ | 35196 |
| Comparative Example 1 | X | 32134 |
| Comparative Example 2 | X | 31726 |

INDUSTRIAL APPLICABILITY

The retroreflective article of the invention may be specifically applied to the retroreflective article and, retroreflective sheet, which can be used in the traffic sign, the construction sign, the commercial sign, and the vehicle license plate, and the retroreflective article can be cut in any azimuth due to its excellent rotation angularity.

The invention claimed is:
1. A triangular pyramidal cube corner retroreflective article, in which a triangular pyramidal cube corner retroreflective element pair group comprising a number of cube corner retroreflective element pairs disposed in a closest-packed fashion on a common plane (S plane) are defined by three base lines (A-B, B-C, and C-A) of respective triangular pyramidal cube corner retroreflective elements, each of the triangular pyramidal cube corner retroreflective element pairs including triangular pyramidal cube corner retroreflective elements having one shared base line (A-B),
   each of the triangular pyramidal cube corner retroreflective elements having two interior angles (α=∠BAC and β=∠ABC) between the shared base line (A-B) shared by the pair of triangular pyramidal cube corner retroreflective elements and two other base lines (B-C and C-A) that are different from each other, and
   the triangular pyramidal cube corner retroreflective element pair group comprising:
   a first element pair group including triangular pyramidal cube corner retroreflective element pairs, in each of which a pair of triangular pyramidal cube corner retroreflective elements is line-symmetrically disposed in relation to the shared base line (A-B); and
   a second element pair group including triangular pyramidal cube corner retroreflective element pairs, in which each of the element pairs has a shape congruent to a shape line-symmetric to the triangular pyramidal cube corner retroreflective element pair in the first element pair group in relation to a line segment connecting vertexes (C1 and C2) of the base planes in a direction perpendicular to the shared base line of the triangular cube corner retroreflective element pair in the first element group.
2. The triangular pyramidal cube corner retroreflective article according to claim 1, wherein an inclination angle (θ) ranges from 0.5 to 25 degrees, and an azimuth angle (θa) ranges from 5 to 85 degrees or from 95 to 175 degrees, where the inclination angle (θ) of an optical axis is an angle (∠PHQ)

defined by an intersection (P) of a perpendicular drawn from a vertex (H) of a traingular pyramidal cube corner retroreflective element to a base plane (ABC) and an intersection (Q) of the optical axis and the base plane (ABC), and where a direction angle (θa) of the optical axis is an angle (∠CPQ) defined by a line segment (C-P) formed by a vertex (C) of the base plane triangle (ABC) and the intersection (P) and a line (P-Q).

3. The triangular pyramidal cube corner retroreflective article according to claim 2, wherein the inclination angle (θ) ranges from 3 to 15 degrees, and the azimuth angle (θa) ranges from 25 to 65 degrees or from 115 to 155 degrees.

4. The triangular pyramidal cube corner retroreflective article according to claim 3, wherein the azimuth angle (θa) ranges from 40 to 50 degrees or from 130 to 140 degrees.

5. The triangular pyramidal cube corner retroreflective article according to claim 4, wherein the inclination angle (θ) ranges from 4 to 8 degrees, and the azimuth angle (θa) ranges from 43 to 47 degrees or from 133 to 137 degrees.

6. The triangular pyramidal cube corner retroreflective article according to claim 1, wherein values (α/180°, β/180°, χ/180°)exist in one of a first region surrounded by (0.250, 0.275, 0.475), (0.450, 0.475, 0.075), and (0.050, 0.475, 0.475) and a second region surrounded by (0.275, 0.250, 0.475), (0.475, 0.450, 0.075), and (0.475, 0.050, 0.475), when values (α/180°, β/180°, χ/180° obtained by respectively dividing three internal angles α(∠BAC) , β(∠ABC) , and χ(∠ACB) of the triangular pyramidal cube corner retroreflective element by 180° are expressed in a triangular coordinate.

7. The triangular pyramidal cube corner retroreflective article according to claim 1, wherein a height (h=HP) of the triangular pyramidal cube corner retroreflective element ranges from 20 to 4,000 µm.

8. The triangular pyramidal cube corner retroreflective article according to claim 7, wherein the height (h=HP) of the triangular pyramidal cube corner retroreflective element ranges from 60 to 150 µm.

9. The triangular pyramidal cube corner retroreflective article according to claim 1, wherein at least one of heights (ha, hb, and hc) from apexes (H1 and H2) of the triangular pyramidal cube corner retroreflective element pair to common planes (Sa plane, Sb plane, and Sc plane) is different from other heights, when a common plane (Sa plane) is defined by base lines of reflective side faces (a1 and a2) of the triangular pyramidal cube corner retroreflective element, a common plane (Sb plane) is defined by base lines of reflective side faces (b1 and b2) of the triangular pyramidal cube corner retroreflective element, and a common plane (Sc plane) is defined by base lines of reflective side faces (c1 and c2) of the triangular pyramidal cube corner retroreflective element.

10. The triangular pyramidal cube corner retroreflective article according to claim 9, wherein the heights (ha, hb, and hc) from the apexes (H1 and H2) of the triangular pyramidal cube corner retroreflective element pair to common planes (Sa plane, Sb plane, and Sc plane) are different from one another.

11. The triangular pyramidal cube corner retroreflective article according to claim 1, wherein:

$$1.05 \angle hmax/hmin \angle 1.9$$

where hmax is the maximum height and hmin is the minimum height of the heights (ha, hb, and hc).

12. The triangular pyramidal cube corner retroreflective article according to any one of claims 9 to 11, wherein hmax is a height between a plane defined by a shortest base line and the apexes (H1 and H2) and hmin is a height between a plane defined by a longest base line and the apexes (H1 and H2), when hmax is the maximum height and hmin is the minimum height of the heights (ha, hb, and hc).

13. The triangular pyramidal cube corner retroreflective article according to claim 1, wherein the triangular pyramidal cube corner retroreflective element is formed by V-shape grooves (x, y1, and y2) having a substantially V-shaped cross section and a V-groove angle in at least one of directions has a deviation (dVx, dVy1, or dVy2) of ±(0.1 to 30) min, when Vx, Vy1 and Vy2 are theoretical V-groove angles with which prism vertex angles (Pab, Pbc, and Pca) become 90 degrees.

14. The triangular pyramidal cube corner retroreflective article according to claim 13, wherein the V-groove angle in at least one of directions has a deviation (dVx, dVy1, or dVy2) of ±(0.2 to 10) min.

15. The triangular pyramidal cube corner retroreflective article according to claim 13, wherein the V-groove angle in at least one of directions of the V-shape grooves (x, y1, and y2) is formed to have at least two types of deviations alternatively.

16. The triangular pyramidal cube corner retroreflective article according to claim 14 or 15, wherein the V-groove angle in at least one of directions of the V-shape grooves has a left-right asymmetrical V-shape groove shape.

17. The triangular pyramidal cube corner retroreflective article according to claim 1, wherein the triangular cube corner retroreflective element is defined by grooves (x, y1 and y1) having substantially V-shape cross sections, and a trajectory of a base portion of a groove in at least one of directions of the V-shape grooves (x, y1, and y2) is a non-linear base line which does not form a straight line.

18. The triangular pyramidal cube corner retroreflective article according to claim 17, wherein a non-linear factor (γAB, γBC, or γCA) ranges from 0.0001 L to 0.05 L, the non-linear factor (γAB, γBC, or γCA) being a maximum distance between an end-to-end straight line connecting both ends of the non-linear base line and an intersection of the non-linear base line with a perpendicular from the end-to-end straight line to the non-linear base line, when L is a length of the end-to-end straight line.

19. The triangular pyramidal cube corner retroreflective article according to claim 17 or 18, wherein the trajectory of the non-linear base line is expressed by a curved line selected from the group consisting of an arc, a trigonometric function, an inverse trigonometric function, an elliptical function, a hyperbolic function, and a combination thereof.

20. The triangular pyramidal cube corner retroreflective article according to claim 17 or 18, wherein the trajectory of the non-linear base line is expressed by a polygonal line in which straights lines are combined.

21. The triangular pyramidal cube corner retroreflective article according to claim 1, wherein a cross sectional shape of at least one of the V-groove angles of the V-shape groove (x, y1, and y2) is a non-linear cross section which does not form a straight line.

22. The triangular pyramidal cube corner retroreflective article according to claim 21, wherein a non-linear factor (γAB, γBC, or γCA) ranges from 0.0001 G to 0.05 G, the non-linear factor (γAB, γBC, or γCA) being defined by a maximum distance between an end-to-end straight line connecting both ends of the non-linear cross section and an intersection of a perpendicular from the end-to-end straight line to the non-linear cross section, when G is the length of the end-to-end straight line.

23. The triangular pyramidal cube corner retroreflective article according to claim 21 or 22, wherein the non-linear cross section is expressed by a curved line selected from the group consisting of an arc, a trigonometric function, an inverse trigonometric function, an elliptical function, a hyperbolic function, and a combination thereof.

24. The triangular pyramidal cube corner retroreflective article according to claim 21 or 22, wherein the trajectory of the non-linear cross section is expressed by a polygonal line in which straights lines are combined.

25. The triangular pyramidal cube corner retroreflective article according to claim 1, wherein the shared base line (A-B) of the triangular pyramidal cube corner retroreflective element pair included in the first element pair group does not pass through intersections (A1 and B1) where other two sets of base lines (B-C1 and C1-A; and B-C2 and C2-A) intersect,
a base plane of one of the triangular pyramidal cube corner retroreflective elements forms a pentagon (A-A1-C1-B1-B), and a base plane of the other triangular pyramidal cube corner retroreflective element forms a triangle (A-C2-B),
heights (h1 and h2) of the triangular pyramidal cube corner retroreflective element pairs included in the first element pair group are different from each other, and
the triangular pyramidal cube corner retroreflective element pair included in the second element pair group is congruent to a line-symmetrical shape to the triangular pyramidal cube corner retroreflective element pair included in the first element pair group in relation to a line segment connecting the vertexes (C1 and C2) of the base plane of the first element pair.

26. The triangular pyramidal cube corner retroreflective article according to claim 25, wherein a plane (Sc plane) defined by the shared base line (A-B) of the triangular pyramidal cube corner retroreflective element pair included in the first element pair group is formed with a depth which is different from that of a common plane (S plane) defined by two base lines (B1-C1 and C1-A1; and B-C2 and C2-A).

27. The triangular pyramidal cube corner retroreflective article according to claim 25 or 26, wherein hx is larger than hy when hx is a height from the Sc plane to a vertex of a larger one of the heights (h1 and h2) of the elements, and hy is a height from the S plane to a vertex of a larger one of the heights (h1 and h2) of the elements.

28. The triangular pyramidal cube corner retroreflective article according to claim 25 or 26, wherein $1.05 \leq hx/hy \leq 1.5$.

29. The triangular pyramidal cube corner retroreflective article according to claim 28, wherein $1.07 \leq hx/hy \leq 1.4$.

30. The triangular pyramidal cube corner retroreflective article according to claim 25 or 26, wherein hx is smaller than hy.

31. The triangular pyramidal cube corner retroreflective article according to claim 30, wherein $0.67 \leq hx/hy \leq 0.95$.

32. The triangular pyramidal cube corner retroreflective article according to claim 31, wherein $0.71 \leq hx/hy \leq 0.93$.

33. The triangular pyramidal cube corner retroreflective article according to claim 1, wherein base planes of the triangular pyramidal cube corner retroreflective element pairs included in the first element pair group and the second element pair group form quadrangles (A-D1-E1-B and A-D2-E2-B), wherein base lines (D1-E1 and D2-E2) are parallel to the shared base line (A-B).

34. The retroreflective article according to claim 33, wherein an inclination angle of the optical axis of the triangular pyramidal cube corner retroreflective element is equal to or larger than +3 degrees.

35. The retroreflective article according to claim 34, wherein the inclination angle of the optical axis of the triangular pyramidal cube corner retroreflective element ranges from +5 to 20 degrees.

36. The retroreflective article according to any one of claims 33 to 35, wherein the inclination angle of the optical axis of the triangular pyramidal cube corner retroreflective element ranges from +7 to 12 degrees.

37. The retroreflective article according to any one of claims 33 to 35, wherein $0.4 \leq r/s \leq 0.95$, when r is a distance between two trapezoidal base lines (A-B and E1-D1 or A-B and E2-D2) forming an isosceles trapezoidal base plane of the triangular pyramidal cube corner retroreflective element, and s is a distance between the base line (A-B) and intersections (C1 and C2) of extended lines of other oblique lines (A-D1, B-E1 and A-E2, B-D2).

38. The retroreflective article according to claim 37, wherein $0.5 \leq r/s \leq 0.9$.

39. A method for forming a triangular pyramidal cube corner retroreflective article according to claim 1,
the method comprising the steps of:
forming the triangular pyramidal cube corner retroreflective article with a parallel groove group (x) and parallel groove groups (y1 and y2), wherein
a cross section of the parallel groove group (x) form a substantially symmetrical V-shape, and a trajectory of a base portion of the parallel groove group (x) form a straight line, and
cross sections of the parallel groove groups (y1 and y2) form a substantially symmetrical V-shape, and trajectories of base portions of the parallel groove groups (y1 and y2) form a polygonal line.

40. The method according to claim 39, wherein the linear parallel groove group (x) differs from the polygonal line parallel groove groups (y1 and y2) in depth.

41. The method according to claim 39 or 40, wherein the linear parallel groove group (x) has a V-shape, and a groove width (w) of the base portion ranges from 5 to 100 μm.

42. The method according to claim 40, wherein the groove width (w) of the base portion ranges from 15 to 50 μm.

43. The retroreflective article according to claim 36, wherein $0.4 \leq r/s \leq 0.95$, when r is a distance between two trapezoidal base lines (A-B and E1-D1 or A-B and E2-D2) forming an isosceles trapezoidal base plane of the triangular pyramidal cube corner retroreflective element, and s is a distance between the base line (A-B) and intersections (C1 and C2) of extended lines of other oblique lines (A-D1, B-E1 and A-E2, B-D2).

44. The retroreflective article according to claim 43, wherein $0.5 \leq r/s \leq 0.9$.

* * * * *

UNITED STATES PATENT AND TRADEMARK OFFICE
CERTIFICATE OF CORRECTION

PATENT NO. : 8,459,806 B2  
APPLICATION NO. : 12/438048  
DATED : June 11, 2013  
INVENTOR(S) : Ikuo Mimura et al.

Page 1 of 4

It is certified that error appears in the above-identified patent and that said Letters Patent is hereby corrected as shown below:

In the Specification:

COLUMN 1:

Line 64, "other," should read --other;--.

COLUMN 2:

Line 17, "bases" should read --base--; and  
Line 64, "cloths." should read --cloth.--.

COLUMN 3:

Line 29, "is" should read --has--.

COLUMN 4:

Line 19, "show" should read --shows--; and  
Line 65, "is" should read --are--.

COLUMN 5:

Line 26, "with" should read --from--.

COLUMN 7:

Line 14, "light" should read --light is--;  
Line 16, "at" should be deleted;  
Line 29, "small" should read --a small--; and  
Line 38, "plurality" should read --plural--.

Signed and Sealed this  
Nineteenth Day of November, 2013

Teresa Stanek Rea  
*Deputy Director of the United States Patent and Trademark Office*

CERTIFICATE OF CORRECTION (continued)
U.S. Pat. No. 8,459,806 B2

COLUMN 8:

Line 54, "is" should read --are--.

COLUMN 9:

Line 12, "is" should read --has--;
Line 15, "orientated" should read --oriented--; and
Line 47, "other" should read --the other--.

COLUMN 10:

Line 50, "defined" should read --defined as--; and
Line 55, "is" should read --has--.

COLUMN 11:

Line 44, "sectional" should read --section--.

COLUMN 12:

Line 16, "region is" should read --regions are--; and
Line 17, "trouble" should read --problem--.

COLUMN 13:

Line 11, "the each of" should read --each of the--; and
Line 42, "orientated" should read --oriented--.

COLUMN 14:

Line 52, "grove" should read --groove--.

COLUMN 15:

Line 2, "line" should read --lines--;
Line 11, "the" should be deleted;
Line 12, "each of" should read --each of the--; and
Line 15, "angle" should read --angles--.

COLUMN 16:
Line 23, "(JIS 22245)" should read --(JIS Z 2245)--; and
Lines 30-32, "because such troubles that the accurate cutting is hardly performed by
softening the thin plate during the cutting are not generated."
should read --in order to avoid difficulty in accurately cutting the thin plate.--.

COLUMN 19:

Line 58, "to" should be deleted.

COLUMN 22:

Line 52, "able" should read --ably--.

COLUMN 23:

Line 22, "straights" should read --straight--;
Line 27, "cross sectional" should read --cross-sectional--; and
Line 46, "straights" should read --straight--.

COLUMN 24:

Line 18, "comparing" should read --compared--.

COLUMN 25:

Line 48, "metrical" should read --metry--.

COLUMN 26:

Line 22, "turn table," should read --turntable,--;
Line 38, "are" should be deleted; and
Line 59, "dra" should read --draw--.

COLUMN 27:

Line 23, "cross" should read --cross- --; and
Line 55, "illustrate" should read --illustrates--.

COLUMN 28:

Line 24, "smaller than 10;" should read --smaller than 20;--; and
Line 48, "to" should read --is--.

In the Claims:

COLUMN 31:

Line 21, "$\chi/180°)$exist" should read --$\chi/180°)$ exist--.

CERTIFICATE OF CORRECTION (continued)
U.S. Pat. No. 8,459,806 B2

COLUMN 32:

Line 27, "y1)" should read --y2)--;
Line 49, "straights" should read --straight--;
Line 51, "cross sectional" should read --cross-sectional--; and
Line 52, "groove" (2nd occurrence) should read --grooves--.

COLUMN 33:

Line 6, "straights" should read --straight--.

COLUMN 34:

Line 30, "form" should read --forms--; and
Line 32, "form" should read --forms--.